US006953827B2

(12) United States Patent
Hara et al.

(10) Patent No.: US 6,953,827 B2
(45) Date of Patent: Oct. 11, 2005

(54) RESIN COMPOSITION AND METHOD FOR PRODUCING THE SAME

(75) Inventors: Tetsuya Hara, Kurashiki (JP); Syukiti Kawamura, Kurashiki (JP); Yukio Ozeki, Osaka (JP); Naohiko Uchiumi, Okayama (JP); Kaoru Ikeda, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/848,015

(22) Filed: May 19, 2004

(65) Prior Publication Data

US 2005/0009987 A1 Jan. 13, 2005

(30) Foreign Application Priority Data

| | | |
|---|---|---|
| May 20, 2003 | (JP) | 2003-142237 |
| Aug. 7, 2003 | (JP) | 2003-289149 |
| Oct. 22, 2003 | (JP) | 2003-362442 |
| Oct. 22, 2003 | (JP) | 2003-362443 |

(51) Int. Cl.[7] .......... C08L 77/00

(52) U.S. Cl. .......... 525/58; 525/60; 525/178; 525/421; 525/426

(58) Field of Search .......... 525/58, 60, 178, 525/421, 426

(56) References Cited

U.S. PATENT DOCUMENTS

| | | | |
|---|---|---|---|
| 4,795,781 | A | 1/1989 | Miyamoto et al. |
| 4,999,229 | A | 3/1991 | Moritani et al. |

FOREIGN PATENT DOCUMENTS

| | | |
|---|---|---|
| EP | 0 322 891 | 7/1989 |
| JP | 1-253442 | 10/1989 |
| JP | 4-114060 | 4/1992 |
| JP | 4-178447 | 6/1992 |
| JP | 5-1819 | 1/1993 |
| JP | 5-140386 | 6/1993 |
| JP | 6-23924 | 2/1994 |
| JP | 8-256756 | 10/1996 |

*Primary Examiner*—Ana Woodward
(74) *Attorney, Agent, or Firm*—Oblon, Spivak, McClelland, Maier & Neustadt, P.C.

(57) ABSTRACT

The present invention provides a resin composition including an ethylene-vinyl alcohol copolymer (EVOH) and a polyamide resin and having outstanding properties in terms of long-term run stability, appearance, and hot water resistance in melt molding. In this resin composition, 70 mol % or more of all the terminal ends of the polyamide resin are blocked with units including an imide structure. At least a portion of the units containing an imide structure may be units containing a cyclic imide structure.

19 Claims, No Drawings

RESIN COMPOSITION AND METHOD FOR PRODUCING THE SAME

BACKGROUND OF THE INVENTION

1. Field of the Invention

The present invention relates to a resin composition containing an ethylene-vinyl alcohol copolymer (hereafter may be abbreviated as "EVOH") and a polyamide resin.

2. Description of the Related Art

Resin compositions of EVOH and polyamide resin have gas barrier properties, oil resistance, and solvent resistance, which are due to EVOH, as well as hot water resistance (retort resistance), which is due to polyamide resin (see, for example, JP 1-253442A). For this reason, these resin compositions serve many applications, such as films, sheets, containers for food packaging.

The film made of a resin composition of EVOH and polyamide resin often suffers from "cracks," which may appear to be delamination, when a stress concentrates on the film as a result of bending, expansion/contraction, or the like, during retort sterilization. In view of this, a multilayer package in which appearance defects arising from bending of this resin composition under a high water content are suppressed has been proposed (see JP 6-23924A).

In the resin composition of EVOH and polyamide resin in a melted state, EVOH and polyamide resin react with each other. For this reason, if melt molding is performed for a long time, deterioration products of the resin are adhered to a discharge port or a screw of an extruder, or gels are produced in a molded product, making it difficult to continue the molding. That is, this resin composition has the problem of poor long-term run stability in melt molding. Another problem is that, if the molded product such as a film and a multilayer package contains gels, the molded product suffers from appearance defects such as delamination when it undergoes a process under severe conditions, such as a retorting process.

In order to solve these problems, various techniques have been proposed. For example, it has been proposed to improve melt-moldability by using a resin composition composed of EVOH and a polyamide resin in which a terminal carboxylic group has been modified into an N-substituted carboxylic amide group using a monoamine compound (see JP 5-1819B). It has also been proposed to improve hot water resistance and stretchability by using a resin composition composed of EVOH and a polyamide copolymer in which the amount of terminal amino groups is made less than the amount of terminal carboxyl groups by using a terminal controlling agent (see JP 4-178447A).

Also among the techniques that have been proposed are: techniques in which thermal stability in melt molding is improved by blending EVOH and a polyamide resin in which, using acid anhydride or the like, terminal amino groups are modified to be 30 $\mu$eq/g or less (see JP 5-140386A and JP 4-114060A), and a technique for improving shape-retaining properties during and after retort sterilization by blending EVOH and a polyamide resin modified with a diamine compound and a carboxylic acid (see JP 8-259756A).

Nevertheless, the above-described previous attempts to solve the problems have not yielded sufficient improvement effects, as will be shown in the later-described Comparative Examples.

SUMMARY OF THE INVENTION

It is an object of the present invention to provide a resin composition including EVOH and a polyamide resin that exhibits good gas barrier properties and hot water resistance and moreover has good long-term run stability in melt molding and appearance after melt molding.

The present invention provides a resin composition including an ethylene-vinyl alcohol copolymer (A) and a polyamide resin (B), wherein 70 mol % or more of all terminal ends of the polyamide resin (B) are blocked with units containing an imide structure.

In the resin composition of the present invention, the polyamide resin (B), 70 mol % or more of all the terminal ends of which are blocked with units containing a imide structure. The resin composition of the present invention has good thermal stability when melting and therefore exhibits outstanding long-term run stability in melt molding. Therefore, by using the resin composition of the present invention, it is possible to provide molded products that exhibit good appearance and shape-retaining properties during and after retort sterilization over a long period of time.

DETAILED DESCRIPTION OF THE PREFERRED EMBODIMENTS

In a preferred embodiment of the present invention, at least a portion of the units containing an imide structure in the polyamide resin (B) is units containing a cyclic imide structure. Here, it is preferable that at least a portion of the units containing a cyclic imide structure be units containing a phthalimide structure or a succinimide structure.

In a preferred embodiment of the invention, the amount of terminal amino groups of the polyamide resin (B) is 10 $\mu$eq/g or less.

In a preferred embodiment of the invention, 75 mol % or more of the units constituting the polyamide resin (B) are caproamide units. Herein, the term "caproamide unit" denotes a unit represented by the formula —NH—$(CH_2)_5$—CO—.

In a preferred embodiment of the invention, the EVOH (A) has an ethylene content of 10 to 65 mol % and a saponification degree of 90 mol % or more.

In a preferred embodiment of the invention, the weight ratio (A/B) of the EVOH (A) with respect to the polyamide resin (B) is from 95/5 to 50/50.

The present invention also provides, in accordance with another aspect, a method for producing a resin composition, the method including a step of mixing, preferably melt-kneading, an ethylene-vinyl alcohol copolymer (A) and a polyamide resin (B), wherein 70 mol % or more of all terminal ends of the polyamide resin (B) are blocked with units containing an imide structure.

In this producing method, it is preferable that the relative viscosity of the polyamide resin (B) be 2.0 to 7.0. In the present specification, the relative viscosity denotes measured values at 25° C. using an Ubbelohde viscometer.

In the producing method of the present invention, it is preferable to react a polyamide resin (C), 75 mol % or more of all terminal ends of which are amino groups, with a terminal-blocking agent (D) capable of forming an imide structure with the amino groups, to obtain the polyamide resin (B). In this case, it is preferable that 75 mol % or more of the units that constitute the polyamide resin (C) be caproamide units. Furthermore, it is preferable that the relative viscosity of the polyamide resin (C) be 2.0 to 7.0. Moreover, it is preferable that at least a portion of the terminal-blocking agent (D) be a cyclic acid anhydride. In this case, at least a portion of the cyclic acid anhydride is preferably a phthalic anhydride or a succinic anhydride.

The present invention further provides, in accordance with still another aspect, a polyamide resin having terminal ends, 70 mol % or more of all of which are blocked with units containing an imide structure. Preferred embodiments of this polyamide resin are as already described above in the preferred embodiments of the polyamide resin (B). The polyamide resin of the present invention is suitable for applications in which the reaction at terminal ends should be suppressed, and the applications thereof are not limited to the blending with the EVOH (A).

The EVOH (A) can be obtained by saponifying an ethylene-vinyl ester copolymer. A representative example of vinyl ester is vinyl acetate, but other vinyl esters, for example, fatty vinyl ester (vinyl propionate, vinyl pivalate, etc.), may also be used.

A preferable content of ethylene units in the EVOH (A) is 10 to 65 mol %, more suitably, 20 to 45 mol %. When the ethylene content is less than 10 mol %, the gas barrier properties under high humidity can degrade. On the other hand, when the ethylene content exceeds 65 mol %, sufficient gas barrier properties may not be obtained. The saponification degree the EVOH (A) should preferably be 90 mol % or more, more preferably, 96 mol % or more, and even more preferably, 98 mol % or more. When the saponification degree is less than 90 mol %, not only does the gas barrier properties under high humidity degrade but also the thermal stability of the EVOH deteriorates, and consequently, the film surface obtained through a film-formation is apt to produce gels.

The EVOH (A) may contain a small amount of, for example, 10 mol % or less of a copolymerizable component. Examples of the copolymerizable component include: α-olefins such as propylene, isobutene, 4-methyl-1-pentene, hexene, and octene; unsaturated carboxylic acids such as itaconic acid, methacrylic acid, acrylic acid, and maleic anhydride, as well as salts thereof, partial or complete esters thereof, nitriles thereof, amides thereof, and anhydrides thereof, vinylsilane-based compounds such as vinyltrimethoxysilane; and unsaturated sulfonic acids and salts thereof.

A preferable range of melt flow index (MFI) (190° C., 2160 g) of the EVOH (A), which can be given as an example, is 0.1 to 100 g/10 minute. It should be noted that when the melting point of the resin is at about 190° C. or exceeds 190° C., the MFI of the resin is obtained by measuring MFI at a plurality of temperatures equal to or higher than 190° C., then plotting the reciprocals of the absolute temperatures are plotted on the horizontal axis and the MFI (logarithms) on the vertical axis of a semilogarithmic graph, and extrapolating the values to 190° C.

A preferable range of MFI (230° C., 2160 g) of the resin composition of the present invention is 1.0 to 100 g/10 minutes. The MFI at 230° C. is obtained in the same manner as is the MFI at 190° C.

In order to improve various properties, a variety of minor components may be added to the EVOH (A). Well-known addition components to EVOH are carboxylic acids and salts thereof, phosphoric acid compounds, boron compounds, alkali metal salts, alkaline earth metal salts, and the like. By adding these components, long-term run stability and interlayer adhesiveness when the EVOH is laminated with another resin can be improved. Addition of the minor components can be carried out by, for example, contacting EVOH with an aqueous solution containing a predetermined component.

Alkali metal salts are desirable components for improving interlayer adhesiveness or the like of EVOH, but, if the aqueous solution that is brought into contact with the EVOH is alkaline, stability of the EVOH in melt molding may degrade. For this reason, a carboxylic acid such as acetic acid is often added to the aqueous solution containing an alkali metal salt. However, when the amount of carboxylic acid radicals increases in the EVOH, an odor resulting from the carboxylic acid radicals becomes a problem, particularly in food packaging applications. This problem can be solved by dissolving carbon dioxide gas in the aqueous solution containing an alkali metal salt.

Boron compounds are desirable compounds for improving long-term run stability of EVOH, but with long-term run stability, further improvement is demanded. This improvement is made possible by adding carbon dioxide gas to an aqueous solution containing a boron compound. Specifically, if a treatment is performed using an aqueous solution in which carbon dioxide gas is added to reduce the content of carboxylic acid and further a boron compound is added, the long-term run stability of EVOH, and further, the long-term run stability of a resin composition containing the EVOH and a polyamide resin, can be improved.

For the EVOH (A) in the resin composition of the present invention, conventionally known EVOH can be used without any particular restrictions; however, taking the foregoing into consideration, it is preferable that at least one selected from alkali metal salt and boron compound be added to the EVOH, and the EVOH be obtained by a producing method including a step of contacting the EVOH with an aqueous solution containing carbon dioxide gas.

Although the shape of the EVOH that is treated with the aqueous solution is not limited, EVOH formed into pellets should preferably be used. EVOH pellets can be obtained by, for example, precipitating EVOH in a strand with an alcohol solution of EVOH after saponifying it in a coagulation bath, and then cutting the strand. The water-containing EVOH pellets thus obtained is suitable for a treatment with the aqueous solution.

The amount of carbon dioxide gas in the aqueous solution is not particularly limited, but it is desired that the amount be greater than the amount of carbon dioxide gas in the air that naturally dissolves in the solution. The concentration of carbon dioxide gas in the aqueous solution (specifically, the concentration calculated from the total of free carbon dioxide and carbonic acid) should preferably be 0.5 mmol/L or more, more preferably be 2 mmol/L or more, and still more preferably be 10 mmol/L or more. To increase the amount of dissolved carbon dioxide gas, the treatment may be carried out under a pressurized condition of about 1.5 to 10 atm.

When EVOH pellets are continuously processed using a continuous-type process vessel, particularly when using a column vessel, too high a concentration of carbon dioxide gas in the aqueous solution can result in air bubbles around the EVOH pellets, which can adversely affect settling of the pellets. For this reason, when the process is carried out continuously, it is recommended that the concentration of carbon dioxide gas in the aqueous solution be set to be lower than the saturation concentration of carbon dioxide gas, for example, 0.95 times or less of the saturation concentration of carbon dioxide gas, and more preferably 0.9 times or less of the saturation concentration of carbon dioxide gas. Nevertheless, the treatment of the EVOH pellets with the aqueous solution may be carried out using a batch-type process vessel.

It is preferable that the aqueous solution for treating EVOH contain an alkali metal salt. When an alkali metal salt is added, interlayer adhesiveness and long-term run stability of the resin composition can be improved. Although a preferable range of the content of alkali metal salt in the aqueous solution can vary depending on the water content of the EVOH pellets, it is generally 0.05 to 40 mmol/L. A more preferable lower limit of this range is 0.1 mmol/L, and a more preferable upper limit is 20 mmol/L.

The cationic species of the alkali metal salt is not limited, but it is recommended that the alkali metal salt be added as a lithium salt, a sodium salt, a potassium salt, a rubidium salt, or a cesium salt, more preferably, as a sodium salt or potassium salt, and still more preferably as a potassium salt. Use of a potassium salt makes it easy obtain a resin composition containing EVOH and polyamide that has both good interlayer adhesiveness and good long-term run stability.

The anionic species of the alkali metal salt is not limited, but it is recommended that the alkali metal salt be added as a carbonate, a hydrogen carbonate, a phosphate, a hydrogen phosphate salt, a hydroxide, or a carboxylic acid salt, and more preferably a carbonate, a hydrogen carbonate, a hydrogen phosphate salt, or a hydroxide. Alternatively, it may be added as a borate. Nevertheless, in order to reduce the content of carboxylic acid radicals, a carboxylic acid salt should be avoided.

The aqueous solution for treating EVOH should preferably contain a boron compound. The addition of a boron compound can, for example, suppress occurrences of "die build-up" at the die lips during the melt molding of the resin composition. The concentration of a boron compound in the aqueous solution is preferably 0.1 to 50 mmol/L in terms of boron element. A more preferable lower limit of the concentration is 0.5 mmol/L, and still more preferably 1 mmol/L or more, and a more preferable upper limit is 40 mmol/L, and still more preferably 30 mmol/L. When the concentration exceeds 50 mmol/L, EVOH tends to gel easily, degrading the appearance of molded products.

The boron compound is not particularly limited, but examples thereof include boric acids, boric acid esters, borate salts, and boron hydrides. Usable boric acids include orthoboric acids, metaboric acids, and tetraboric acids; usable boric acid esters include triethyl borate and trimethyl borate; and usable borate salts include alkali metal salts and alkaline earth metal salts of the above-noted boric acids, as well as borax. A particularly preferable boron compound is orthoboric acid (which hereinafter may be simply referred to as "boric acid").

Particularly, when used for food packaging applications, it is preferable that carboxylic acids or the salts thereof not be added to the aqueous solution for treating EVOH. Even when carboxylic acids or the salts thereof are not added to the aqueous solution, it is possible for carboxylic acids or the salts thereof that remain in EVOH to dissolve from the EVOH into the aqueous solution. However, such a trace amount of the carboxylic acid radicals that derive from this does not produce an odor to such a degree that causes a problem.

The aqueous solution for treating the EVOH may further contain a phosphoric acid compound. The addition of a phosphoric acid compound permits the resin composition to easily obtain a good balance between long-term run stability in melt molding, and coloring resistance, particularly coloring resistance in high-temperature molding, and interlayer adhesiveness. When an appropriate amount of a phosphoric acid compound is added to EVOH, coloring of the molded products and formation of gels and hard spots arising from melt molding can be suppressed. Preferably, the concentration of a phosphoric acid compound in the aqueous solution is 0.01 to 10 mmol/L in terms of phosphoric acid radical. A more preferable lower limit of the concentration is 0.03 mmol/L, still more preferably 0.05 mmol/L, and yet still more preferably 0.1 mmol/L, whereas a more preferable upper limit is 5 mmol/L, still more preferably 3.5 mmol/L, and yet still more preferably 2.5 mmol/L.

Although the phosphoric acid compound is not particularly limited, inorganic phosphoric acid compounds are preferable, and examples include phosphoric acid, phosphorous acid, and their salts. The phosphoric acid salts may be any of primary phosphate, secondary phosphate, and tertiary phosphate. The cationic species of phosphoric acid salts is not limited either, but alkali metal salts are suitable. Examples of particularly preferred phosphoric acid compounds include sodium dihydrogen phosphate, potassium dihydrogen phosphate, disodium hydrogen phosphate, and dipotassium hydrogen phosphate.

The aqueous solution for treating EVOH may further contain an alkaline earth metal salt. Nevertheless, since alkaline earth metal salts tend to easily form carbonates with poor solubility, it is not appropriate to add them in a large amount. Depending on applications, the addition of an appropriate amount of alkaline earth metal salt can sometimes further improve the long-term run stability in melt molding. The concentration of alkaline earth metal salt in the aqueous solution is preferably 0 to 10 mmol/L in terms of alkaline earth metal. The upper limit of the concentration is more preferably 5 mmol/L, and still more preferably 3 mmol/L.

The cationic species of the alkaline earth metal salts is not limited, and magnesium salts, calcium salts, barium salts, strontium salt, and the like may be used; among them, magnesium salts and calcium salts are preferable. The anionic species of the alkaline earth metal salts is not limited either, and carbonates, hydrogen carbonates, phosphoric acid salts, hydrogen phosphate salts, hydroxides, carboxylic acid salts, and the like may be used; among them, carbonates, hydrogen carbonates, hydrogen phosphate salts, hydroxides are preferable. Many of the alkaline earth metal salts show poor solubility with water, but the presence of carbonic acids enhances the solubility. With the alkaline earth metal salts too, it is desirable to avoid addition of carboxylic acid salts thereof.

The pH of the aqueous solution for treating EVOH is preferably 3.5 to 6.5. By adding carbon dioxide gas, the aqueous solution can be easily controlled to be acidic to such a degree as described above. The pH value should preferably be 3.8 or higher, and more preferably 4 or higher; and it should preferably be 6.3 or lower, more preferably 6.0 or lower, and especially preferably 5.8 or lower.

It is recommended that contacting of the aqueous solution with EVOH be carried out, for example, by dipping EVOH pellets into the aqueous solution. The shape of the EVOH pellets may be any shapes, for example, powdery, granular, spherical, or columnar shape. It is desirable that the aqueous solution be contacted with water-containing EVOH pellets. This is in order to make the components to be added contain in EVOH pellets efficiently and uniformly. The water content of the EVOH pellets is preferably 10 to 80 weight %, for example; more preferable is 20 weight % or higher, and still more preferable is 30 weight % or higher; likewise, more preferable is 75 weight % or less, and still more preferable is 70 weight % or less.

The temperature of the aqueous solution for treating EVOH is not particularly limited, but should preferably be 10° C. to 90° C. When the temperature is less than 10° C., it will take a long time to perform uniform addition. On the other hand, when it exceeds 90° C., the saturation solubility of carbon dioxide gas reduces, making the aqueous solution difficult to contain a sufficient amount of carbon dioxide; further, the pellets may be melt-bonded with one another. The temperature of the aqueous solution is more preferably 20° C. or higher, and still more preferably 30° C. or higher, and it is 85° C. or lower, and still more preferably 80° C. or lower. When the temperature of the aqueous solution is 70° C. or higher, it is recommended that the contacting be carried out under a pressure of about 1.5 to 10 atm to compensate the reduction of the solubility of carbonic acid.

Although the treating time for which the EVOH is kept contact with the aqueous solution may be varied depending on the shape of the EVOH, it is preferably 1 hour or longer, and more preferably 2 hours or longer, when the EVOH is pellets of about 1 to 10 mm.

It is also possible that the EVOH is contacted with the aqueous solution in advance and thereafter the components and/or carbon dioxide gas to be added thereto is/are dissolved in the aqueous solution. However, in order to obtain an EVOH of stable quality, in which additives are uniformly contained, it is preferable to contact EVOH with the aqueous solution that has been prepared in advance.

The contacting of EVOH and the aqueous solution may be carried out by either a batch system or a continuous system. With the continuous type, a suitable example includes a method in which, in a tower-type vessel, the EVOH is contacted with the aqueous solution, which is continuously supplied, while the EVOH is gradually being moved downward.

The EVOH (EVOH resin composition), to which minor components are added by contacting with the aqueous solution, is dewatered, if necessary, and is thereafter supplied to a drying process. The method of drying is not particularly limited; either a fluidized dryer or a ventilation dryer may be used, or both of them may be used. However, preferable is a method in which the EVOH is dried by fluidizing drying and subsequently by ventilation drying. Although not particularly limited, the drying temperature is desirably about 70° C. to 120° C. It is recommended that the water content of the EVOH after having been dried be, for example, 1 weight % or less, and more preferably, 0.5 weight % or less. The dried EVOH pellets thus obtained are mixed, preferably melt-kneaded, with a polyamide resin.

It is preferable that EVOH (A) contain an alkali metal salt at 0.1 to 20 μmol/g in terms of alkali metal, 0 to 2 μmol/g of carboxylic acid radical (c1) that is extracted by a dipping treatment in water at 95° C. for 10 hours, and 0 to 40 μmol/g of carboxylic acid radical (c2) that is extracted by a dipping treatment in a 0.05 N aqueous solution of sodium hydroxide of 95° C. for 10 hours.

This preferable EVOH (A1) does not easily produce odors due to the small amount of the carboxylic acid radicals, and moreover, it shows good long-term run stability in melt molding because it contains a predetermined amount of alkali metal salt. The EVOH (A1) can be obtained by contacting with the above-described aqueous solution, but it may be obtained through a method other than the above.

The EVOH (A1) exhibits, because of the alkali metal salt, improvements in interlayer adhesiveness in the resin composition, as well as coloring resistance and long-term run stability in melt molding. When the content of the alkali metal salt is less than 0.1 μmol/g, improvements in these properties are insufficient, whereas when it exceeds 20 μmol/g, coloring resistance during melting may become poor. When the content of the alkali metal salt is 0.1 to 0.3 μmol/g, coloring resistance and long-term run stability during melting are relatively good; however, when it is used for a multilayer construction with another resin, adhesive strength will be insufficient with the use of an ordinary acid anhydride modified adhesive resin.

A preferable lower limit of the alkali metal salt content is 0.3 μmol/g or more, and more preferably, 0.5 μmol/g, and a preferable upper limit thereof is 15 μmol/g, more preferably 10 μmol/g, and particularly preferably 8 μmol/g.

It is preferable that the alkali metal salt content and the ethylene content in the EVOH (A1) satisfy the following expression (1):

$$0.95\times\exp(0.039\times ET)-2\leqq a\leqq 0.95\times\exp(0.039\times ET)+2 \quad (1)$$

In the expression, a denotes an alkali metal salt content (μmol/g) in terms of alkali metal, and ET denotes an ethylene content (mol %) in EVOH.

When the value a exceeds the upper limit in the expression (1), the color phase of the EVOH (A1) may degrade, whereas when it is less than the lower limit according to the expression (1), long-term run stability and adhesiveness can degrade. It is more preferable that the value a satisfy the following expression (1'), and it is still more preferable that the value a satisfy the following expression (1").

$$0.95\times\exp(0.039\times ET)-1.5\leqq a\leqq 0.95\times\exp(0.039\times ET)+1.5 \quad (1')$$

$$0.95\times\exp(0.039\times ET)-1\leqq a\leqq 0.95\times\exp(0.039\times ET)+1 \quad (1')$$

The amount of carboxylic acid radicals (c1) extracted through a dipping treatment in water at 95° C. for 10 hours is approximately equal to the total amount of the carboxylic acid and the carboxylic acid salt contained in the EVOH. The content of carboxylic acid radicals (c1) is preferably 1.5 μmol/g or lower, more preferably 1 μmol/g or lower, and especially preferably 0.5 μmol/g or lower.

The amount of carboxylic acid radicals (c2) extracted through a dipping treatment in an aqueous solution of 0.05 N sodium hydroxide at 95° C. for 10 hours is approximately equal to the total amount of the carboxylic acid and the carboxylic acid salt contained in the EVOH and unsaponificated carboxylic acid ester groups remaining in the EVOH. This is because the carboxylic acid ester group remaining in EVOH is saponified by sodium hydroxide and a carboxylic acid salt is liberated. The content of the carboxylic acid radicals (c2) is preferably 20 μmol/g or lower, more preferably 10 μmol/g or lower, still more preferably 5 μmol/g or lower, and particularly preferably 2 μmol/g or lower.

Melt-kneading of a resin containing EVOH is normally carried out at a high temperature of 200° C. or higher. For this reason, it is considered that the carboxylic acid ester group remaining in the EVOH reacts with water to cause hydrolysis, liberating a carboxylic acid or causing transesterification with a carboxylic acid or a carboxylic acid salt. In addition, it is also possible that the carboxylic acid and the carboxylic acid salt react with the hydroxyl group of the EVOH, producing a carboxylic acid ester group, or causing transesterification with the carboxylic acid ester group. Therefore, adverse effects due to such chemical reactions in the melted resin cannot be ignored in melt molding, particularly in long-time melt molding.

The EVOH (A1) focuses on this fact; by specifying the total amount of the carboxylic acid content, the carboxylic acid salt content, and the carboxylic acid ester content, which can be converted into one another, improvements in melt stability and prevention of odors are intended. By restricting the amount of the carboxylic acid radicals (c1) that initially exist in a free form, and also restricting the amount of the carboxylic acid radicals (c2), which additionally includes those that may be liberated in a heated and melted condition, it is possible to obtain a resin composition having suppressed odors and good long-term run stability.

Another preferable example of the EVOH (A) is EVOH (A2), which contains 0.1 to 20 μmol/g, in terms of alkali metal, of an alkali metal salt, 0 to 2 μmol/g of carboxylic acid radicals (c1) that are extracted through a dipping treatment in water at 95° C. for 10 hours, and has a saponification degree of 99.7 to 100 mol %.

In the EVOH (A2), in place of the amount of carboxylic acid radicals (c2), the amount of unsaponificated carboxylic acid ester group is defined by saponification degree. The saponification degree of the EVOH (A2) is preferably 99.7 mol % or more, more preferably 99.8 mol % or more, still more preferably 99.9 mol % or more, and particularly preferably 99.95 mol % or more.

The EVOH (A) may contain a boron compound. The content of the boron compound in the EVOH is desirably 1 to 200 μmol/g in terms of boron element. The content thereof is preferably 2 μmol/g or more, and more preferably, 3 μmol/g or more, but it is preferably 150 μmol/g or lower, and more preferably, 100 μmol/g or lower.

The EVOH (A) may contain a phosphoric acid compound. The content of the phosphoric acid compound in the EVOH in terms of phosphoric acid radical is preferably 5 μmol/g or lower, more preferably 4 μmol/g or lower, especially preferably 3 μmol/g or lower, and particularly preferably 1.5 μmol/g or lower; and it is preferably 0.05 μmol/g or more, more preferably 0.1 μmol/g or more, especially preferably 0.15 μmol/g or more, and particularly preferably 0.2 μmol/g or more.

In this case, it is preferable that the ratio (a/d) of the content of the phosphoric acid compound (d: μmol/g) in terms of phosphoric acid radical to the content of the alkali metal salt (a: μmol/g) in terms of alkali metal in the EVOH (A) be 2.4 to 50. The reason is that a resin composition having a good color tone and good long-term run stability can be obtained. When this ratio (a/d) is less than 2.4, sufficient long-term run stability may not be obtained, whereas when the ratio (a/d) exceeds 50, the color phase may degrade and adverse effects may be caused on the long-term run stability. More preferably, the ratio (a/d) is 40 or less, and still more preferably 30 or less.

The EVOH (A) may contain an alkaline earth metal salt. It is desirable that the content of the alkaline earth metal salt in the EVOH be 0 to 10 μmol/g in terms of alkaline earth metal. The content thereof is more preferably 5 μmol/g or lower, and still more preferably 3 μmol/g or lower. When suppressing the coloring in melt molding should be considered important, the content thereof should preferably be 2 μmol/g or lower, and more preferably 1 μmol/g or lower, and especially preferred is a range such that the alkaline earth metal salt is substantially not contained.

The polyamide resin (B) that constitutes the resin composition of the present invention has terminal ends, 70 mol % or more of all of which are blocked with units containing a imide structure. When this proportion is less than 70 mol %, improvements in the long-term run stability are insufficient, and it is thus difficult to obtain molded products having good appearance. The proportion is desirably 75 mol % or more.

Although the imide structure is not particularly limited, it is preferable that at least a portion of the imide structure be a cyclic imide structure. Examples of the cyclic imides that constitute this structure include phthalimide, succinimide, glutarimide, 3-methylglutarimide, maleimide, dimethylmaleimide, trimellitimide, and pyromellitimide; among these, phthalimide and succinimide are preferable. The blocking structure of the terminal end containing a phthalimide structure can be represented by the following formula (1), and the blocking structure of the terminal end containing a succinimide structure can be represented by the following formula (2).

(1)

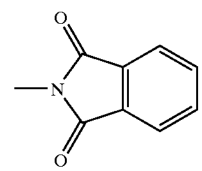

(2)

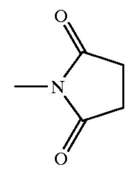

The amount of terminal amino groups in the polyamide resin (B) is preferably ten/one-million equivalent per 1 g of the resin, that is, 10 μeq/g or less, more preferably 7 μeq/g or less, and particularly preferably 4 μeq/g or less. When the amount of terminal amino groups exceeds 10 μeq/g, the long-term run stability in melt molding may not improve sufficiently, or the color tone of the resin composition may degrade.

Although the type of the polyamide resin (B) is not particularly limited, preferable is a polyamide resin mainly composed of caproamide. More specifically, it is preferable that 75 mol % or more of the units that constitute the polyamide resin (B) be caproamide units. Examples of the polyamide resin (B) include polycaproamide (PA6), caprolactam/lauryllactam copolymer (PA6/12) and caprolactam/hexamethylene adipamide copolymer (PA6/66).

Examples of the structure units other than the caproamide units include structure units derived from: cyclic lactams other than caprolactams, such as butyrolactam and lauryllactam; amino carboxylic acids such as 1,10-aminodecanoic acid and 1,12-aminododecanoic acid; dicarboxylic acids such as malonic acid, succinic acid, glutanic acid, adipic acid, pimelic acid, suberic acid, azelaic acid, sebacic acid, undecanedionic acid, dodecanedionic acid, hexadecanedionic acid, eicosanedionic acid, eicosenedionic acid, docosanedionic acid, 2,2,4-trimethyladipic acid, dimer acid, 1,4-cyclohexane dicarboxylic acid, terephthalic acid, isophthalic acid, phthalic acid, and xylylenedicarboxylic acid; and diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tri-decamethylenediamine, hexadecamethylene diamine, 2,2,4-(or 2,4,4-) trimethylhexamethylenediamine, cyclohexanediamine, methyl cyclohexanediamine, bis-(4,4'-aminocyclohexyl) methane, xylylenediamine, and phenylenediamine.

Preferably, the relative viscosity [ηr] of the polyamide resin (B) is in the range of 2.0 to 7.0, and more preferably, 2.5 to 5.0. When the relative viscosity [ηr] is less than 2.0, the formation of strands and the formation of films in melt molding become difficult. On the other hand, when the relative viscosity [ηr] exceeds 7.0, the compatibility of the polyamide resin (B) with the EVOH (A) becomes low due to the excessively high melt viscosity, and it is difficult to obtain desirable melt-moldability.

Preferably, the MFI of the polyamide resin (B) is in the range of 0.1 to 100 g/10 minute (230° C., 2160 g), and more preferably 1 to 50 g/10 minute. When the MFI is less than 0.1 g/10 minute, the compatibility of the polyamide resin (B) with the EVOH becomes low, due to the excessively high melt viscosity, and it is difficult to obtain desirable melt-moldability. On the other hand, when the MFI exceeds 100 g/10 minute, the formation of strands, the formation of films in melt molding, or the like becomes difficult.

Although the producing method of the polyamide resin (B) is not particularly limited, it is necessary to use a monomer containing an imide bond, or to perform imidization during the production process, in order to allow its terminal ends to contain an imide structure at an appropriate amount. Of these, performing imidization during the production process is preferable since the molecular weight can be easily controlled. Specific examples include a) a method in which the terminal-blocking agent (D) and a molecular weight modifier are added when polymerizing the polyamide resin (B) to control the degree of polymerization and the terminal structure, and b) a method in which the polyamide resin (C) that has been polymerized using a molecular weight modifier in advance is reacted with the terminal-blocking agent (D) to control the terminal structure. From the viewpoint that the blocking of terminals is reliably performed, the above-described producing method (b) is preferable.

Examples of the molecular weight modifier include diamines having 4 to 20 carbon atoms, such as ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1, 12-dodecanediamine, 1,13-tridecanediamine, 1, 16-hexadecanediamine, cyclohexanediamine, methylcyclohexanediamine, cyclohexanedimethanamine, bis(4,4'-aminocyclohexyl)methane, trimethylpentane-1,5-diamine, 2,2,4-(or 2,4,4-) trimethylhexane-1,6-diamine and xylylenediamine. Among these, 1,5-pentanediamine, 1,6-hexanediamine, and 1,7-heptanediamine are preferable from the viewpoints of boiling point and reactivity of the compound itself, accuracy in controlling molecular weight, and yield of polyamide resin (C) obtained.

As the molecular weight modifier, in addition to the above-noted diamines, it is also possible to use, in combination, known molecular weight modifiers for polyamide resin, which include aliphatic monocarboxylic acids such as acetic acid, propionic acid, butyric acid, valeric acid, caproic acid, enanthic acid, caprylic acid, capric acid, pelargonic acid, myristic acid, palmitic acid, stearic acid, oleic acid, and linoleic acid; alicyclic monocarboxylic acids such as cyclohexane carboxylic acid and methyl cyclohexane carboxylic acid; and aromatic monocarboxylic acids such as benzoic acid, toluylic acid, ethylbenzoic acid, and phenylacetic acid.

In the polyamide resin (C) that is obtained using a molecular weight modifier, it is preferable that 75 mol % or more of all the terminal ends be amino groups. When this proportion is less than 75 mol %, the proportion of the imide structure that occupies the terminal structure of the polyamide resin (B) cannot be increased sufficiently. The proportion thereof is desirably 85 mol % or more.

Although the types of the polyamide resin (C) are not particularly limited, polyamide resins mainly composed of caproamides are preferable. Specifically, it is preferable that 75 mol % or more the units that constitute the polyamide resin (C) be caproamide units. Examples of such polyamide resins (C) are similar resins to the above-noted polyamide resin (B). The above-noted examples also applies to the constituting units other than the caproamide units.

The polyamide resin (C) can be obtained by, for example, mixing a monomer capable of forming the above-noted constitutional units and a molecular weight modifier, and melt-polymerizing the mixture in the range of 200° C. to 280° C. for 0.2 to 4 hours. In order to allow 75 mol % or more of all the terminal ends of the resin to be amino groups, it is preferable to add a diamine in the range of 0.01 to 2 weight % with respect to the above-noted monomer.

It is preferable that the relative viscosity [ηr] of the polyamide resin (C) thus obtained be 2.0 to 7.0, and more preferably, 2.5 to 5.0. When the relative viscosity [ηr] is less than 2.0, formation of strands is difficult in producing the polyamide resin (B). On the other hand, when the relative viscosity [ηr] exceeds 7.0, the compatibility of the resin with the terminal-blocking agent (D) degrades in producing the polyamide resin (B).

The terminal-blocking agent (D) is not particularly limited as long as it is a compound that is capable of forming an imide structure with the amino group contained in the polyamide resin (C). Examples of such a compound include cyclic acid anhydrides, such as succinic anhydride, phthalic anhydride, glutaric anhydride, 3-methylglutaric anhydride, maleic anhydride, dimethylmaleic anhydride, trimellitic anhydride, and pyromellitic anhydride. Among these, phthalic anhydride and succinic anhydride are preferable from the viewpoints of reactivity with the amino group of the polyamide resin (C), thermal stability of the compound itself, and the like.

The polyamide resin (B) can be obtained by mixing the polyamide resin (C) with the terminal-blocking agent (D) to cause them to react at a temperature in the range of 190° C. to 290° C., or preferably in the range of +5° C. to +80° C. from the melting point of the polyamide resin (C), using a batch-type reactor, a single-screw or twin-screw extruder, and the like. When reaction temperature is lower than 190° C., the reactivity between the polyamide resin (C) and the terminal-blocking agent (D) may decrease. On the other hand, when the temperature exceeds 290° C., the polyamide resin (C) itself may undergo a thermal decomposition.

The adding amount of the terminal-blocking agent (D) is preferably 0.95 to 3.0 equivalents with respect to the amount of the amino groups in the polyamide resin (C), and more preferably 1.0 to 2.0 equivalents. When the adding amount of the terminal-blocking agent (D) is less than 0.95 equivalents, the amount of the imide structure contained in the polyamide resin (B) to be obtained may become insufficient. On the other hand, when the adding amount of the terminal-blocking agent (D) exceeds 3.0 equivalents, the polyamide resin (B) obtained may suffer from such problems as color tone defects and bleed-out of unreacted product. The reaction time in this case is preferably in the range of 0.1 to 30 minutes.

The weight ratio (A/B) of the EVOH (A) to the polyamide resin (B) is preferably in the range of 95/5 to 50/50, more preferably 92/8 to 60/40, and still more preferably 90/10 to 70/30. When the weight ratio exceeds 95/5, hot water resistance becomes insufficient and appearance abnormality may occur during a retort treatment of the packaging material made of the resin composition or immediately after the treatment. On the other hand, when the weight ratio (A/B) is less than 50/50, the gas barrier properties of the resin composition obtained may degrade.

The resin composition of the present invention may contain various additives such as antioxidants, coloring agents, UV absorbers, slip agents, antistatic agents, plasticizers, crosslinking agents such as boric acids, inorganic fillers, inorganic desiccants, and various resins such as super absorbent polymer resins, to such an extent that they do not adversely affect the advantageous effects attained by the present invention.

In order to mix the EVOH (A) and the polyamide resin (B) with adding the above-noted additives as needed, known methods may be used. Preferable from the viewpoints of cost and simplicity of the process is a melt-kneading method using a single-screw or a twin-screw extruder (unidirectional or bi-directional), an intensive mixer, a continuous intensive mixer, and the like. The kneading temperature is desirably in the range of 150° C. to 280° C. To prevent the resin composition obtained from oxidizing, it is recommended to seal the hopper port with nitrogen and to carry out the extrusion at low temperature. The longer the kneading time is, the better the consequences will be; however, from the viewpoints of preventing the resin composition from oxidizing and production efficiency, the kneading time is preferably 0.1 to 20 minutes.

The resin composition of the present invention can be molded into various molded products, such as films, sheets, containers, and so forth, by employing an appropriate molding method. In this case, the resin composition of the present invention may be once pelletized and then molded, or the components of the resin composition may be dry blended and then directly molded. The melt-mold products thus obtained have good gas barrier properties and outstanding hot water resistance, and therefore are suitable for use as food packaging, especially for use as containers, bags, pouches, lids for containers, packaging containers for boiling sterilized or retort sterilized food products, and the like that are hermetically sealed by heat sealing. The resin composition of the present invention also has desirable properties for packaging various articles other than food products, for example, for packaging materials for pharmaceuticals, agricultural chemicals, cosmetics, detergents, organic chemicals, components for audio products, and stationery.

A structure containing the resin composition of the present invention is useful as containers for boiling sterilization or retort sterilization. Here, the term "a structure" means a molded product the shape of which has three-dimensional features, and illustrative examples thereof include bags, containers, lids thereof, and pouches.

Multilayer products, such as multilayer films and multilayer structures, having a layer containing the resin composition of the present invention are also useful in the above-noted applications illustrated as examples.

A film containing the resin composition of the present invention is useful as is the above-noted structure. It is recommended that the film be a stretched film obtained by stretching a single-layer pre-stretch film (original film for stretching) obtained by melt molding the resin composition two times or longer in at least one axial direction. By stretching the film, it is possible to further improve the gas barrier properties of the original film. Also, as will be shown in the later-described Examples, use of the above-described resin composition in obtaining the stretched film makes it possible to produce the stretched film stably for a long period.

Hereinafter, a method for obtaining a film by stretching a resin composition of the present invention is described. In this case, it is recommended that a single layer, pre-stretch film made by melt molding the resin composition be stretched at least two times or longer in one axial direction to obtain a stretched film. By the stretching, it is possible to further improve the gas barrier properties of the original film. Also, as will be shown in the later-described Examples, use of the above-described resin composition in obtaining a stretched film makes it possible to obtain a stretched film stably for a long period.

The producing method for the pre-stretch film is not particularly limited, but melting the resin composition with an extruder and discharging the melt from a round die or a T die can simplify the process and reduce production cost. In order to improve stretchability of the original film, it is recommended that the pre-stretch film obtained by melt molding be quenched. Quenching the pre-stretch film suppresses crystallization of the resin composition during cooling and easily ensures good stretchability. The method of quenching is not particularly limited, and employable are a water cooling method, an air cooling method, a metal roll-contacting method, and the like.

The stretch ratio of the pre-stretch film is 2 times or more, preferably 2.5 times or more, and particularly preferably 3 times or more. The stretching may be either of uniaxial stretching or biaxial stretching, but biaxial stretching is preferable in order to improve the gas barrier properties and mechanical strength of the stretched film sufficiently. In the case of biaxial stretching, it is preferable that the original film be stretched to, in area ratios, 3 times or more, more preferably 4 times or more, and particularly preferably 6 times or more.

Examples of the method of stretching the pre-stretch film are a double bubble method, a tenter method, and a rolling method. Among these, the tenter method is preferable in that accuracy in film thickness is superior. Specifically, it is possible to stretch the original film in a longitudinal direction with a longitudinal stretching machine in which several rolls are combined, and thereafter stretch it in a lateral direction with a tenter type stretching machine; or alternatively, it is possible to stretch the film in a lateral direction and thereafter stretch it in a vertical direction. Simultaneous biaxial stretching may be carried out by the tenter method or the double bubble method.

The stretching temperature is not particularly limited; however, preferred is a temperature equal to or lower than the melting point of the resin composition that constitutes the pre-stretch original film, more preferable is a temperature lower than the melting point by 60° C. or more, and particularly preferred is a temperature lower than the melting point by 80° C. or more. When the stretching temperature is lowered, stretching may become difficult in some cases. In view of this, it is recommended to employ a water-containing pre-stretch film in stretching. The water-containing pre-stretch film may be obtained by a method of melt molding water-containing resin composition pellets, a method of dipping a pre-stretch film into hot water (preferably at 60° C. to 90° C.), and the like.

Herein, the term "stretching temperature" means a surface temperature of the pre-stretch film that is immediately before being stretched.

It is preferable that the obtained stretched film be subjected to a heat treatment to further improve its gas barrier properties and mechanical strength. Nevertheless, when the film is used as a heat shrinkable film, the heat treatment is unnecessary. Although the heat treatment temperature is not particularly limited, it is recommended that the difference between the melting point of the resin composition that forms the stretched film and the heat treatment temperature be 10° C. or less. The heat treatment temperature must also be determined according to the surface temperature of the stretched film.

Although the thickness of the stretched film is not particularly limited, preferable is 3 to 30 μm. When the thickness is less than 3 μm, the strength of the film reduces, and pinholes and the like easily occur. On the other hand, when the thickness exceeds 30 μm, applications of the film may be restricted in some cases, and uniform stretching becomes difficult since the use of a thick pre-stretch film is necessary. Preferably, the thickness of the stretched film is 5 to 25 μm, and more preferably 7 to 20 μm.

It is possible to use the stretched film as a single layer, but it is also possible to laminate it with other materials, for example, with a substrate made of a thermoplastic resin such as polyamide, polyester, and polyolefin and with an adhesive resin, to form a multilayer film. When taking cost etc. into consideration, it is desirable that the thickness of the stretched film with respect to the total layer thickness be 2 to 30%.

Examples of the method for producing the multilayer film include, but are not particularly limited to, a method in which a thermoplastic resin is melt-extruded on a single layer stretched film, and a method in which a single layer stretched film and another substrate are laminated with an adhesive agent such as an organic titanium compound, an isocyanate compound, and a polyester-based compound (dry lamination method).

Illustrative examples of layer constructions of the multilayer film are as in the following, wherein a layer made of stretched film is E, a layer made of a thermoplastic resin is R, and an adhesive resin layer is Ad:

R1/Ad/E/Ad/R2

(R1, R2) are: (polyamide, polyolefin)
(polyester, polyolefin)
(polyolefin, polyolefin) etc.

R1/Ad/E/Ad/R2/Ad/R3

(R1, R2, R3) are: (polyamide, polyamide, polyolefin)
(polyester, polyamide, polyolefin) etc.

Nevertheless, the layer construction of the multilayer film is not limited to the foregoing. In addition, as illustrated above, the R layers may be of either the same type or different types from one another.

An example of the multilayer film is a multilayer stretched film obtained by subjecting a resin composition containing the EVOH (A) and the polyamide resin (B), and a thermoplastic resin other than this resin composition to coextrusion molding to form a multilayer structure (multilayer pre-stretch film), and thereafter stretching it in at least one axial direction, preferably 2 times or more, by a co-stretching method or the like. The foregoing resin composition and the other thermoplastic resin are melted preferably in respective separate extruders, and the melt is then discharged in the form of multilayer using a round die or a T die, followed by cooling. The methods for the co-stretching include methods of uniaxially or biaxially stretching with a double bubble method, a tenter method, a rolling method or the like, as well as methods of press-rolling with rolls.

Illustrative examples of the layer construction of the multilayer stretched film obtained by coextrusion and co-stretching include R1/E/R2, R1/E/Ad/R2, and R1/Ad/E/Ad/R2: wherein a layer made of the above-described resin composition is E; a layer made of a thermoplastic resin such as a polyamide resin, a polyolefin resin, and a polyester resin is R; and an adhesive resin layer is Ad. In this case as well, the thermoplastic resin layers may be of either the same type or different types. The multilayer stretched film further has a recycled resin layer formed of scraps such as trims that are produced in molding, or alternatively, a recycled resin may be blended with the thermoplastic resin layer.

Preferable polyamide resins in multilayer films include, but are not particularly limited to, polycaproamide (PA6), polyhexamethylene adipamide (PA66), and polylaurolactam (PA12). Examples of the polyolefin resin include homopolymers or copolymers of olefins such as polyethylene, polypropylene, polybutene, and polypentene, but polypropylene is preferable. Examples of the polyester resin include polyethylene terephthalate and polyester elastomer.

Although the producing method of the multilayer pre-stretch film is not particularly limited, it is recommended that the multilayer obtained through melt molding be quenched to improve stretchability, as in the case of the single layer pre-stretch original film.

The stretch ratio, stretching method, stretching temperature, and heat treatment for the multilayer pre-stretch film are similar to the foregoing explanation regarding the pre-stretch original film.

It should be noted that when both R1 and R2 are polyamide resin in the foregoing R1/Ad/E/Ad/R2 layer construction, it is preferable that a two-stage heat treatment be carried out in which heat treatment is first performed at a temperature higher than the melting point of that polyamide resin and thereafter heat treatment is performed at a temperature at which the difference from the melting point of that polyamide resin is 10° C. or less.

The total layer thickness of the multilayer stretched film is not particularly limited, but preferable is 5 to 50 μm. When the total layer thickness is less than 5 μm, the mechanical strength of the film reduces, and formation of pinholes or the like is likely to occur. On the other hand, when the total layer thickness exceeds 50 μm, applications of the film may be limited. The thickness of the multilayer stretched film is preferably 7 to 30 μm, and especially preferably 9 to 25 μm.

The multilayer stretched film may be used alone, but it may also be formed into a laminate with other materials, for example, with a thermoplastic resin, such as a polyamide, a polyester, and a polyolefin, and with an adhesive resin layer. Examples the other materials include, more specifically, linear low density polyethylene, low density polyethylene, medium density polyethylene, high density polyethylene, ethylene-vinyl acetate copolymers, ethylene-propylene copolymers, polyamides, and polyesters.

The method for producing the above-noted laminate is not particularly limited, and similar methods to those used for producing the multilayer film.

As described above, the resin composition of the present invention may be laminated with layers made of other materials and used as a multilayer structure such as a bag and a container. Hereinbelow, the multilayer structure will be discussed in more details.

For the other materials, it is possible to use paper, metal foils, or the like, in addition to the thermoplastic resin layer and the adhesive resin. Examples of the method for forming the multilayer include coextrusion, extrusion lamination, sandwich lamination, dry lamination, and wet lamination. The sheet or film obtained by these methods may be secondarily molded into bags, thermoformed containers, cups, tubes, boxes, and the like, as needed.

The number of layers that form the multilayer structure, and the types of the layers are not limited. However, preferable for applications that demand transparency and for applications that accompany thermoforming is a construction having a total thickness of 50 to 600 μm that includes a 5–50 μm-thick intermediate layer composed of a resin composition containing the EVOH (A) and the polyamide resin (B), and another layer, preferably a thermoplastic resin layer. When the structure is used for boiling or retort applications, the above-noted other layer serves as a protective layer during retort sterilization. The above-noted other layer also serves to maintain the strength required for a package.

When the multilayer structure undergoes retort sterilization, the water content increases in the layer of the resin composition containing the is EVOH (A) and the polyamide resin (B). In order to quicken recovery of the gas barrier properties, it is desirable to release the water content outside the multilayer structure quickly. For this reason, it is recommended for a container made of the multilayer structure to use a layer having a large water-vapor permeability on the outer side of the resin composition layer and to use a layer having a small water-vapor permeability on the inner side thereof.

Heat sealing of the multilayer structure can be effected by disposing a heat-sealable resin layer, for example a polyolefin layer, for the innermost layer. By the polyolefin it is meant high density, medium density, or low density polyethylene; polyethylenes copolymerized with α-olefins such as butene, hexene, and 4-methyl-1-pentene; polypropylene homopolymers; polypropylenes copolymerized with α-olefins such as ethylene, butene, hexene, and 4-methyl-1-pentene; poly(vinyl acetate); poly(acrylic esters); and ionomer resins. Particularly important for the present invention is polypropylenes, which show good hot water resistance, followed by polyethylenes, which shows good low-temperature sealing properties.

When using a thermoplastic resin as the other material, it is possible to select a thermoplastic resin as needed taking into consideration water vapor permeability, heat resistance, strength, heat sealing properties, transparency, and so forth according to the purpose and application of the multilayer structure. Examples of the thermoplastic resin include polyolefins such as polyethylene, polyethylene copolymer, polypropylene, and polypropylene copolymer; polyamides such as polycaproamide (PA6), polyhexamethylene adipamide (PA66), and polylaurolactam (PA12); polyesters; polycarbonates; polystyrenes; and polyvinyl chloride. Preferable are a polyolefin layer containing a polypropylene-based resin, which is superior in hot water resistance and anti-water vapor permeability, and a polyethylene-based resin, which shows good sealing properties, and a polyamide layer, which is superior in strength. It is also possible to use as the adhesive resin between the layers an adhesive resin represented by an olefin-based copolymer modified with an unsaturated carboxylic acid or an anhydride thereof Illustrative examples of the layer construction of the multilayer structure are shown in the following, wherein a layer composed of a resin composition containing the EVOH (A) and the polyamide resin (B) is E and a layer made of a thermoplastic resin is R:

Outside R1/E/R2 Inside (R1, R2) are: (polyethylene, polypropylene) (polyamide, polypropylene) etc.

Outside R1/E/R2/R3 Inside (R1, R2, R3) are: (polyamide, polyamide, polypropylene) etc.

Outside R1/R2/E/R3/R4 Inside (R1, R2, R3, R4) are: (polypropylene, polyamide, polyamide, polypropylene) etc.

If no problem arises in processability, strength, and the like, it is possible to dispose the layer made of the resin composition containing the EVOH (A) and the polyamide resin (B) be disposed on the outermost layer. In any cases, an adhesive layer may be provided between the layers as needed.

When an additional molding by thermoforming or the like is not necessary, it is possible to use a paper having a thickness of 200 to 500 μm as the other material. This makes it possible to obtain a box-shaped retort package for liquid-state food without using an inner bag or the like having gas barrier properties. Also preferable as the other material are an aluminum foil and a vapor-deposited aluminum film, which are excellent in water-shielding and light-shielding properties, and vapor-deposited films of metal oxide such as silica and alumina. Good gas barrier properties and hot water resistance achieved by the layer made of the resin composition containing the EVOH (A) and the polyamide resin (B) compensate for pinholes and vapor deposition defects in these layers having a high degree of gas barrier properties, making it possible to produce packaging materials with high performance and reliability.

The following examples of the layer construction are conceivable as the structure of the present invention using paper or metal:

Outside R1/paper/E/R2 Inside (R1, R2) are: (polypropylene, polypropylene) etc.

Outside R1/E/metal/R2 Inside (R1, R2) are: (polypropylene, polyethylene) etc.

Metal is an aluminum foil etc.

Outside R1/paper/E/metal/R2 Inside (R1, R2) are: (polypropylene, polypropylene) etc.

Metal is an aluminum foil etc.

Outside R1/E/metal/R2/R3 Inside (R1, R2, R3) are: (polyamide, polyester, polypropylene) etc.

Metal is a vapor-deposited alumina layer etc.

EXAMPLES

Hereinbelow, the present invention are described referring to Examples, but it should be understood that the following Examples are not intended in any way to limit the scope of the present invention. The quantification of the measurement values in Examples are in accordance with the following methods. The water used was ion exchange water.

1. Relative Viscosity of Polyamide Resin

Samples of the polyamide resin were dissolved in a 97% concentrated sulfuric acid so that the concentration is 1 g/dL. The obtained solutions were measured at 25° C. using an Ubbelohde viscometer, and thus, relative viscosities (dimensionless quantity) were obtained.

2. Amount of Terminal Amino Group in Polyamide Resin

Samples of the polyamide resin were dissolved in phenol at an appropriate amount. The obtained solutions were titrated with a 0.05 N hydrochloric acid, and amounts of terminal amino groups (μeq/g) were thus obtained.

3. Amount of Terminal Carboxylic Acid in Polyamide Resin

Samples of the polyamide resin were dissolved in benzyl alcohol at an appropriate amount. The obtained solutions were titrated with an aqueous solution of 0.05 N potassium hydroxide, and amounts of terminal carboxylic acid (μeq/g) were thus obtained.

4. Amount of Terminal Imide Structure in Polyamide Resin

Samples of the polyamide resin were dissolved in deuterated hexafluoroisopropanol. The solutions were subjected to an NMR measurement using a nuclear magnetic resonance spectrometer GX-500 (500 MHz-NMR), made by JEOL, Ltd., and from the proportion of the peak area originating from hydrogen of the methylene group adjacent to the terminal imide structure and the peak area originating from hydrogen of the methylene group adjacent to the amide structure in the obtained spectrum, amounts of terminal imide structure (μeq/g) were obtained in values per the weight of polyamide resin.

5. Proportion of Terminal Amino Groups and Proportion of Terminal Imide Structure Assuming the total of the amounts of terminal ends obtained through the above 2 to 4 as the total amount of terminal ends, proportions of terminal amino group and proportions of terminal imide structure were calculated (mol %).

Example 1

Production of Polyamide Resin B-1

A 30-liter pressure-proof reactor was charged with 10 kg of ϵ-caprolactam as a monomer, as a molecular weight modifier, 82 g of 1,6-hexanediamine, and 1.0 kg of water; the mixture was heated to 260° C. with it being stirred and the pressure was increased to 0.5 MPa. Thereafter, the pressure was released to normal pressure, and polymerization was performed at 260° C. for 3 hours. Upon completing the polymerization, the reaction product was formed in strands, was cooled to solidify, and was then cut into pellets. The obtained pellets were washed with a 95° C. hot water, followed by drying, and a polyamide resin C-1 was obtained. The relative viscosity of this resin was 2.7. The amount of terminal amino group was 81 μeq/g, the amount of terminal carboxylic acid was 16 μeq/g, and the proportion of terminal amino group was 84%. These results are shown in Table 1.

5 kg of the polyamide resin C-1 were dry blended with 80 g of phthalic anhydride as the terminal-blocking agent (D), and the blend was mixed with a twin-screw extruder at 260° C. to cause them to react, formed into strands, and cut to obtain a polyamide resin B-1 in a pellet form. This resin had a relative viscosity of 2.6. The amount of terminal amino group, the amount of terminal carboxylic acid, and the amount of terminal phthalimide structure were 4 μeq/g, 20 μeq/g, and 77 μeq/g, respectively. The proportion of terminal imide structure was 76%. These results are shown in Table 2.

Example 2

Production of Polyamide Resin B-2

A polyamide resin C-2 was obtained in the same manner as in Example 1 except that the amount of 1,6-hexanediamine was 75g. A polyamide resin B-2 was obtained in the same manner as in Example 1 except that the polyamide resin C-2 used was in place of C-1 and the terminal-blocking agent (D) used was 50.1 g of succinic anhydride.

Comparative Example 1

Production of Polyamide Resin B-3

A polyamide resin C-3 was obtained in the same manner as in Example 1 except that 43 g of acetic acid was used as a molecular weight modifier. A polyamide resin B-3 was obtained in the same manner as in Example 1 except that the polyamide resin C-3 was used in place of C-1 and the amount of phthalic anhydride used was 29 g.

Comparative Example 2

Production of Polyamide Resin B-4

A polyamide resin C-4 was obtained in the same manner as in Example 1 except that a molecular weight modifier was not used. A polyamide resin B-4 was obtained in the same manner as in Example 1 except that the polyamide resin C-4 was used in place of C-1 and the amount of phthalic anhydride used was 40 g.

Comparative Example 3

Production of Polyamide Resin B-5

Using the polyamide resin C-1 obtained in Example 1, a polyamide resin B-5 was obtained in the same manner as in Example 1 except that 154 g of stearic acid was used in place of 80 g of phthalic anhydride.

Comparative Example 4

Production of Polyamide Resin B-6

Ube Nylon 1011FK, nylon 6 made by Ube Industries, Ltd., was used as a polyamide resin C-6.

A polyamide resin B-6 was obtained in the same manner as in Example 1 except that the polyamide resin C-6 was used in place of C-1 and the amount of phthalic anhydride used was 38.5 g.

The results of Example 2 and Comparative Examples are also shown in Tables 1 and 2.

TABLE 1

Table 1a

| | Resin | Monomer (x) | Molecular weight modifier (y) | y/x (g/g) |
|---|---|---|---|---|
| Ex. 1 | C-1 | ϵ-caprolactam | 1,6-Hexanediamine | 82/10000 |
| Ex. 2 | C-2 | ϵ-caprolactam | 1,6-Hexanediamine | 74/10000 |
| Comp. Ex. 1 | C-3 | ϵ-caprolactam | Acetic acid | 43/10000 |
| Comp. Ex. 2 | C-4 | ϵ-caprolactam | — | — |
| Comp. Ex. 3 | C-1 | ϵ-caprolactam | 1,6-Hexanediamine | 82/10000 |
| Comp. Ex. 4 | C-6*[1] | — | — | — |

TABLE 1b

| | Resin | Relative viscosity | Amount of terminal amino group (μeq/g) | Amount of terminal carboxylic acid (μeq/g) | Amount of terminal imide structure (μeq/g) | Proportion of terminal amino group (mol %) |
|---|---|---|---|---|---|---|
| Ex. 1 | C-1 | 2.7 | 81 | 16 | 0 | 84 |
| Ex. 2 | C-2 | 2.6 | 77 | 21 | 0 | 79 |
| Comp. Ex. 1 | C-3 | 2.5 | 30 | 75 | 0 | 29 |
| Comp. Ex. 2 | C-4 | 2.5 | 40 | 61 | 0 | 40 |
| Comp. Ex. 3 | C-1 | 2.7 | 81 | 16 | 0 | 84 |
| Comp. Ex. 4 | C-6*[1] | 2.4 | 40 | 68 | 0 | 37 |

*[1]Ube Nylon 1011FK made by Ube Industries

TABLE 2

Table 2a

| | Resin (B) | Source material (C) | Terminal-blocking agent (D) | D/C (g/g) |
|---|---|---|---|---|
| Ex. 1 | B-1 | C-1 | Phthalic anhydride | 80/5000 |
| Ex. 2 | B-2 | C-2 | Succinic anhydride | 50.1/5000 |
| Comp. Ex. 1 | B-3 | C-3 | Phthalic anhydride | 29/5000 |
| Comp. Ex. 2 | B-4 | C-4 | Phthalic anhydride | 40/5000 |
| Comp. Ex. 3 | B-5 | C-1 | Stearic acid | 154/5000 |
| Comp. Ex. 4 | B-6 | C-6 | Phthalic anhydride | 38.5/5000 |

Table 2b

| | Resin (B) | Relative viscosity | Amount of terminal amino groups (μeq/g) | Amount of terminal carboxylic acid (μeq/g) | Amount of terminal imide structure (μeq/g) | Proportion of terminal imide structure (mol %) |
|---|---|---|---|---|---|---|
| Ex. 1 | B-1 | 2.6 | 4 | 20 | 77 | 76 |
| Ex. 2 | B-2 | 2.6 | 7 | 23 | 73 | 71 |
| Comp. Ex. 1 | B-3 | 2.5 | 4 | 50 | 53 | 50 |
| Gomp. Ex. 2 | B-4 | 2.4 | 5 | 69 | 35 | 32 |
| Comp. Ex. 3 | B-5 | 2.6 | 10 | 19 | 0 | 0 |
| Comp. Ex. 4 | B-6 | 2.2 | 8 | 75 | 33 | 28 |

Example 3

Eval F101 made by Kuraray (ethylene content: 32 mol %, saponification degree: 99.9%, MFI: 1.5 g/10 minutes (190° C., 2160 g)) was used as the EVOH (A), and the polyamide resin B-1 was used as the polyamide resin (B). These were dry blended at a weight ratio of 90:10 and charged into an extruder equipped with a full-flight type screw, which has a diameter of 40 mm, an L/D ratio of 24, and a compression ratio of 3.8, and using a flat die having a width of 550 mm, a film formation was carried out. The temperatures for the film formation were 190° C. to 240° C. with the extruder and 225° C. with the die. A film having a thickness of 15 μm was wound up with a winding machine, and a continuous film-forming operation was carried out for 24 hours. Twenty-four hours later, the obtained film was subjected to a measurement of oxygen transmission rate, a film surface evaluation, and an appearance assessment after hot water treatment, in accordance with the following methods. The results are shown in Table 3.

6. Oxygen Transmission Rate

The obtained films was subjected to a measurement using OXY-TRAN100 (made by Modern Controls, Inc.) under the conditions of 20° C. and 65% RH to obtain a oxygen transmission rate (ml·15 $\mu m/m^2$·day·atm).

7. Film Surface Evaluation

The obtained film was classified according to the following criteria. Very good: The film surface is uniform and flat. The average film thickness has not changed compared to that immediately after the start of the film-formation test. Foreign matters are not confirmed by visual observation. Good: The film surface is uniform and flat. The average film thickness has not changed compared to that immediately after the start of the film-formation test. A small amount of foreign matters are confirmed by visual observation, but it is practically within an acceptable range. Poor: A large number of foreign matters are confirmed by visual observation. Very poor: Immediately after the start of film-formation test a large number of foreign matters were confirmed by visual observation, and therefore the operation was terminated halfway.

8. Appearance Assessment After Hot Water Treatment

Using the obtained film as the intermediate layer, a biaxially-oriented nylon 6 film (Emblem made by Unitika, with a thickness of 15 μm) as the outer layer, and a non-oriented polypropylene film (RXC-7 made by Tohcello, with a thickness of 60 μm) as the inner layer, Takenate A-385/A-50 made by Takeda Chemical Industries, Ltd., was applied onto these films as an adhesive for dry laminating (two-component type, urethane-based) at 4 $g/m^2$ as solid content, and after evaporating the solvent at 80° C., the films were bonded together and subjected to aging at 40° C. for 5 days; thus, a multilayer film was obtained. From this film, a bag three sides of which were heat sealed was produced, and after filling the bag with a mixture of water and a commercially available salad oil (volume ratio: 90/10), the remaining one side was hermetically sealed by heat sealing. Subsequently, using a retorting equipment (a high-temperature and high-pressure cooking sterilization tester RCS-40RTGN made by Hisaka Works, Ltd.), a hot water treatment was performed at 100° C. for 30 minutes. After the hot water treatment, the bag was preserved in a room at 20° C. and 65% RH for 1 day, and the appearance was assessed according to the following criteria.

Very good: No detachment is confirmed between the intermediate layer and the inner and outer layers, and the transparency of the intermediate layer is maintained.

Good: No detachment is confirmed between the intermediate layer and the inner and outer layers. A little reduction in the transparency of the intermediate layer is observed, but it is practically within an acceptable range.

Poor: Detachment is confirmed between the intermediate layer and the inner and outer layers in the form of white spots.

Very poor: Before the hot water treatment, detachment between the intermediate layer and the inner and outer layers is already confirmed.

Example 4

A continuous film-forming operation was carried out for 24 hours in the same manner as in Example 3 except that the weight ratio of the EVOH (A) and the polyamide resin (B) was 80:20.

Example 5

A continuous film-forming operation was carried out for 24 hours in the same manner as in Example 3 except that the weight ratio of the EVOH (A) and the polyamide resin (B) was 70:30.

Example 6

A continuous film-forming operation was carried out for 24 hours in the same manner as in Example 5 except that the polyamide resin (B) was B-2.

Comparative Example 5

A continuous film-forming operation was carried out for 24 hours in the same manner as in Example 4 except that the polyamide resin (B) was B-3.

Comparative Example 6

A continuous film-forming operation was carried out for 24 hours in the same manner as in Example 5 except that the polyamide resin (B) was B-3.

Comparative Example 7

A continuous film-forming operation was carried out for 24 hours in the same manner as in Example 5 except that the polyamide resin (B) was B-4.

Comparative Example 8

A continuous film-forming operation was carried out for 24 hours in the same manner as in Example 5 except that the polyamide resin (B) was B-5.

Comparative Example 9

A continuous film-forming operation was carried out for 24 hours in the same manner as in Example 5 except that the polyamide resin (B) was B-6.

Comparative Example 10

A continuous film-forming operation was carried out for 24 hours in the same manner as in Example 5 except that the polyamide resin (B) used was Ube Nylon 1011FK, nylon made by Ube Industries, Ltd.

Comparative Example 11

A continuous film-forming operation was carried out for 24 hours in the same manner as in Example 5 except that the polyamide resin (B) used was Amilan CM1001 made by Toray Industries, Inc.

The characteristics of the films obtained according to Examples 4–6 and the above-described Comparative Examples are also shown in Table 3.

TABLE 3

Table 3a

| | EVOH (A) | Polyamide resin (B) Type | Polyamide resin (B) Proportion of terminal imide structure (mol %) | A/B (Weight ratio) |
|---|---|---|---|---|
| Ex. 3 | F101 | B-1 | 76 | 90/10 |
| Ex. 4 | F101 | B-1 | 76 | 80/20 |
| Ex. 5 | F101 | B-1 | 76 | 70/30 |
| Ex. 6 | F101 | B-2 | 71 | 70/30 |
| Comp. Ex. 5 | F101 | B-3 | 50 | 80/20 |
| Comp. Ex. 6 | F101 | B-3 | 50 | 70/30 |
| Comp. Ex. 7 | F101 | B-4 | 32 | 70/30 |
| Comp. Ex. 8 | F101 | B-5 | 0 | 70/30 |
| Comp. Ex. 9 | F101 | B-6 | 28 | 70/30 |
| Comp. Ex. 10 | F101 | 1011FK | 0 | 70/30 |
| Comp. Ex. 11 | F101 | CM1001 | 0 | 70/30 |

Table 3b

| | Oxygen transmission rate (ml · 15 μm/m² · day · atm) | Film surface assessment | Appearance after retort process |
|---|---|---|---|
| Ex. 3 | 0.9 | Very good | Good |
| Ex. 4 | 1.6 | Very good | Very good |
| Ex. 5 | 2.6 | Very good | Very good |
| Ex. 6 | 2.8 | Good | Very good |
| Comp. Ex. 5 | 1.7 | Good | Good |
| Comp. Ex. 6 | 2.9 | Poor | Good |
| Comp. Ex. 7 | 3.0 | Poor | Poor |
| Comp. Ex. 8 | 2.7 | Poor | Good |
| Comp. Ex. 9 | 2.7 | Poor | Poor |
| Comp. Ex. 10 | 2.9 | Very poor | Poor |
| Comp. Ex. 11 | 2.7 | Very poor | Very poor |

The method for measuring the properties in the later-described Example 7 are explained below.

9. Quantification of Alkali Metal Salt

Pellets of dry EVOH (A) were crushed by freeze-crushing. The crushed EVOH (A) thus obtained was sieved through with a sieve having a nominal size of 1 mm (according to Japanese Industrial Standards (JIS) Z-8801, Test sieves standard). 10 g of the sieved powder of the EVOH (A) and 50 mL of an aqueous solution of 0.01N hydrochloric acid were put into a 100 mL stoppered Erlenmeyer flask, and were stirred and heat-extracted at 95° C. for 10 hours with a cooling condenser attached. Then, 2 ml of the obtained extract was diluted with 8 mL of ion exchanged water. The diluted extract was subjected to quantitative analysis using an ion chromatography analyzer IC7000 made by, Yokogawa Electric, to quantify the amounts of Na ions and K ions. For the quantification, calibration curves prepared using an aqueous solution of sodium chloride and an aqueous solution of potassium chloride were used. From the amounts of Na ions and K ions thus obtained, the amount of alkali metal salt contained in the dry EVOH pellets was obtained in terms of metal element.

Ion Chromatography Measurement Conditions:

Column: ICS-C25 made by Yokogawa Electric

Eluent: Aqueous solution containing 5.0 mM of tartaric acid and 1.0 mM 2,6-pyridinedicarboxylic Acid Measurement temperature: 40° C.

Flow rate of eluent: 1 mL/minute

Amount of sample implanted: 50 μL

10. Quantification of Carboxylic Acid Radical (c1) Extracted by Dipping Treatment in Water at 95° C. For 10 Hours Pellets of dry EVOH (A) were crushed by freeze-crushing. The crushed EVOH (A) thus obtained was sieved through with a sieve having a nominal size of 1 mm (according to JIS Z-8801, Test sieves standard). 10 g of the sieved powder of the EVOH (A) and 50 mL of ion exchange water were put into a 100 mL stoppered Erlenmeyer flask, and were stirred and extracted at 95° C. for 10 hours with a cooling condenser attached. Then, 2 mL of the obtained extract was diluted with 8 mL of ion exchanged water. The diluted extract was subjected to quantitative analysis using an ion chromatography analyzer IC7000, made by Yokogawa Electric, and the amount carboxylic acid (acetic acid) ions was quantified to obtain the amount of carboxylic acid radicals (c1). For the quantification, a calibration curve prepared using an aqueous solution of acetic acid was used.

Ion chromatography measurement conditions:

Column: SCS5–252 made by Yokogawa Electric

Eluent: 0.1% aqueous solution of phosphoric acid

Measurement temperature: 40° C.

Flow rate of eluent: 1 mL/minute.

Amount of sample implanted: 50 μL

11. Quantification of Carboxylic Acid Radical (c2) Extracted by Dipping Treatment in an Aqueous Solution of 0.05 N Sodium Hydroxide at 95° C. for 10 Hours Pellets of dry EVOH (A) were crushed by freeze-crushing. The crushed EVOH (A) thus obtained was sieved through with a sieve having a nominal size of 1 mm (according to JIS Z-8801, Test sieves standard). The sieved powder of the EVOH (A) (10 g) and 50 mL of aqueous solution of 0.05 N sodium hydroxide were put into a 100 mL stoppered Erlenmeyer flask, and were stirred and heat-extracted at 95° C. for 10 hours with a cooling condenser attached. Then, 2 mL of the obtained extract was diluted with 7 mL of ion exchanged water, and an aqueous solution of 0.1 N phosphoric acid was added in an amount of 1 mL to prepare a sample solution for analysis. The amount of carboxylic acid ions contained in this sample solution was quantified using an ion chromatography analyzer IC7000 made by Yokogawa Electric, and the amount of carboxylic acid (acetic acid) ions was quantified to obtain the amount of carboxylic acid radicals (c2). The calibration curve used for the quantification was prepared using a sample solution for calibration curve, which was prepared by diluting acetic acid with an aqueous solution of 0.05 N sodium hydroxide, then adding 7 mL ion exchanged water 2 mL of the diluted solution, and further adding 1 mL of aqueous solution of 0.1 N phosphoric acid thereto.

Ion Chromatography Measurement Conditions:

Column: SCS5–252 made by Yokogawa Electric

Eluent: 0.1% aqueous solution of phosphoric acid

Measurement temperature: 40° C.

Flow rate of eluent: 1 mL/minute

Amount of sample implanted: 50 μL

12. Quantification of Boron Compound 50 mg of pellets of dry EVOH (A) were completely combusted by an oxygen flask combustion method, and the obtained combustion ash was dissolved in 10 mL of aqueous solution of 1 mol/L nitric acid. Using this solution, the content of boron compound was obtained with a high-frequency plasma emission spectroscopy (ICP emission spectrometer IRIS AP, made by Jarrel-Ash) in terms of boron element.

13. Quantification of the Phosphoric Acid Compound Content (d)

In the present example, the phosphoric acid compound content (d1) of the pellets before melt-molded and the phosphoric acid compound content (d2) of the single layer film after melt-molded were measured.

For measuring the EVOH (A) pellets before melt-molded, first, dry EVOH (A) pellets were crushed by freeze crushing. The crushed EVOH (A) thus obtained were sieved through with a sieve having a nominal size of 1 mm (according to JIS Z-8801 Test sieves standard). 10 g of the sieved powder of EVOH (A) and 50 mL of an aqueous solution of 0.01 N hydrochloric acid were put into a 100 mL stoppered Erlenmeyer flask, and were stirred and extracted at 95° C. and for 4 hours, with a cooling condenser attached. The obtained extract was subjected to quantitative analysis using an ion chromatography analyzer IC7000 made by Yokogawa Electric, and the amount of phosphate ions was quantified to obtain the amount of phosphoric acid radical (d1: μmol/g). The calibration curve used for the quantification was prepared using an aqueous solution of sodium dihydrogen phosphate.

The single layer film after melt-molded was measured in the same manner as that for the pellet-form sample except that 5 g of the film that was cut into strips was used in place of the 10 g EVOH (A) powder, and the amount of phosphate ions was quantified to obtain the amount of phosphoric acid radical (d2: μmol/g).

Ion Chromatography Measurement Conditions:

Column: ICS-A23 made by Yokogawa Electric

Eluent: aqueous solution containing 2.5 mM sodium carbonate and 1.0 mM Sodium Hydrogencarbonate Measurement temperature: 40° C.

Amount of sample implanted: 50 μL

14. Content of Phosphorus Element (t)

A 100 mg single layer film after melt-molded was completely combusted by an oxygen flask combustion method, and the obtained combustion ash was dissolved in 10 mL of aqueous solution of 1 mol/L nitric acid. Using the solution thus obtained, the content of phosphorus element (μmol/g) was obtained with a high-frequency plasma emission spectroscopy (ICP emission spectrometer IRIS AP, made by Jarrel-Ash).

15. The Content of Organic Phosphorous Compound Extractable with Chloroform

A 100 g single layer film after melt-molded that was crushed into a size of 5 mm square or smaller was filled in an extraction thimble, and 3000 ml of chloroform was put into a flask. Extraction was carried out using a Soxhlet extractor under a reflux condition for 48 hours. From the extract, chloroform was removed with a rotary evaporator, and residue was obtained. The obtained residue was completely combusted by an oxygen flask combustion method, and the obtained combustion ash was dissolved into 10 mL of an aqueous solution of 1 mol/L nitric acid. Using the solution thus obtained, the content of phosphorus element was obtained with a high-frequency plasma emission spectroscopy (ICP emission spectrometer IRIS AP, made by Jarrel-Ash).

16. Measurement of Saponification Degree (NMR Method)

Dried EVOH pellets were crushed by freeze crushing. The obtained crushed EVOH was sieved through a sieve having a nominal size 1 mm (according to JIS Z-8801 Test sieves standard). 5 g of the sieved EVOH powder were dipped into 100 g of ion exchanged water, stirred at 85° C. for 4 hours, and then dewaterd and dried. This operation was repeated two times. Using the washed powdered EVOH obtained, a NMR measurement was carried out according to the following measurement conditions, and the saponification degree was obtained by the following analysis method.

Measurement Conditions

Equipment: Superconducting nuclear magnetic resonance equipment Lambda 500, made by JEOL Observation frequency: 500 MHz Solvent: DMSO-d6

Polymer concentration: 4 weight %

Measurement temperature: 40° C. and 95° C.

Number of integration: 600 times

Pulse delay time: 3.836 seconds

Sample rotation speed: 10 to 12 Hz

Pulse width (90° pulse): 6.75 μsec.

Method of Analysis

In a measurement at 40° C., a peak originating from hydrogen in water molecules was observed in the vicinity of 3.3 ppm, which overlapped with a 3.1–3.7 ppm portion of the peaks originating from the methine hydrogen in the vinyl alcohol unit of the EVOH. On the other hand, in a measurement at 95° C., although the overlap caused at 40° C. was eliminated, the hydrogen peak originating from the hydroxyl group in the vinyl alcohol unit of the EVOH, which exists in the vicinity of 4–4.5 ppm, overlapped a 3.7–4 ppm portion of the peak originating from the methine hydrogen in the vinyl alcohol unit of the EVOH. In view of these results, the quantification of the methine hydrogen in the vinyl alcohol unit of the EVOH (3.1–4 ppm) was performed by employing the data obtained in the measurement at 95° C. for the 3.1–3.7 ppm portion, in order to avoid the overlap with the hydrogen peak originating from water or hydroxyl groups, and employing the data obtained in the measurement at 40° C. for the 3.7–4 ppm portion; and the total of these values was employed as the quantified total amount of the methine hydrogen. It should be noted that it is known that the hydrogen peak originating from water or hydroxyl groups shifts toward the high magnetic field side by increasing the measurement temperature.

Therefore, analysis was made using both the measurement results at 40° C. and at 95° C. as follows. From the above-noted spectra measured at 40° C., an integral value ($I_1$) of the chemical shift peaks in 3.7 to 4 ppm and an integral value ($I_2$) of the chemical shift peaks in 0.6 to 1.8 ppm are obtained. Meanwhile, from the spectra measured at 95° C., an integral value ($I_3$) of the chemical shift peaks in 3.1 to 3.7 ppm, an integral value ($I_4$) of the chemical shift peaks in 0.6 to 1.8 ppm, and an integral value ($I_5$) of the chemical shift peaks in 1.9 to 2.1 ppm are obtained. Here, the chemical shift peaks in 0.6 to 1.8 ppm mainly derive from methylene hydrogen, and the chemical shift peaks in 1.9 to 2.1 ppm derive from methyl hydrogen in unsaponificated vinyl acetate units. From these integral values, saponification degrees were calculated according to the following equation.

$$\text{Saponification degree (mol \%)} = \frac{(I_1/I_2 + I_3/I_4)\times 100}{(I_1/I_2 + I_3/I_4) + (I_5/I_4)/3}$$

17. Intrinsic Viscosity

Sample dry EVOH pellets were precisely weighed to be 0.20 g, and the pellets were heated at 60° C. for 4 hours to dissolve them into 40 mL of aqueous phenol (water/phenol=15/85 weight %). A measurement was carried out with an Ostwald viscometer at a temperature of 30° C. (t0=90 seconds) to obtain an inherent (limiting) viscosity (η) according to the following equation.

$$[\eta]=(2\times(\eta sp-\ln \eta rel))^{1/2}/C(L/g)$$

ηsp=t/t0−1(specific viscosity)

ηrel=t/t0(relative viscosity)

C: EVOH concentration (g/L)

t0time taken by the blank (aqueous phenol) to pass through the viscometer t: time taken by the sample in which the aqueous phenol solution is dissolved to pass through the viscometer 18. Measurement of Water Content in Water-containing EVOH Pellet Using a halogen moisture analyze HR73 made by Mettler Inc., the water content of EVOH pellet was measured under the conditions of a drying temperature of 180° C., a drying time of 20 minutes, and a sample amount of about 10 g.

19. Measurement of Concentration of Carbon Dioxide Gas

A carbon dioxide gas sensor (CE-2041) was connected to a portable ion/pH meter (IM-22P) made by To a Electronics Ltd., and the concentration of carbon dioxide gas in the solution was measured.

20. Single-layer Film Formation Test

Pellets of dry EVOH (A) were subjected to a single-layer film formation using a 20 mm extruder D2020 (D (mm)=20, L/D =20, compression ratio=2.0, screw: full-flight) made by Toyo Seiki Seisaku-Sho, Ltd. under the following conditions, and a single layer film was obtained.

Single-Layer Film Formation

Extrusion temperature: C1/C2/C3/Die=175/200/220/220° C.

Screw rotational speed: 40 rpm

Discharge amount: 1.3kg/hr

Take-up roll temperature: 80° C.

Take-up roll rate: 3.1 m/minute

Film thickness: 20 μm

Coloring Resistance

A single layer film made by the above-described method was wound up on a paper tube, and the degree of coloring at the film edge was assessed with naked human eyes as follows.

Grade: Criteria

A: Not colored

B: Slightly yellowed

C: Yellowed 72 hr. Long-term Run Stability

A film was sampled 72 hours after the start of the single-layer film formation, and the number of gel-like hard spots (those with a size of about 100 μm or larger, which can be confirmed by naked human eyes) in the film was counted. The number of the hard spots was converted into a number per 1.0 $m^2$, and the film was assessed according to the following.

Grade: Criteria

A: Less than 20

B: From 20 to less than 40

C: From 40 to less than 60

D: 60 or more 120 hr. Long-term Run Stability

A film was sampled 120 hours after the start of the single-layer film formation, and the number of gel-like hard spots (those with a size of about 100 μm or larger, which can be confirmed by naked human eyes) was counted. The number of the hard spots was converted into a number per 1.0 $m^2$, and the film was assessed according to the following.

Grade: Criteria

A: Less than 20

B: From 20 to less than 40

C: From 40 to less than 60

D: 60 or more

21. Evaluation of High-temperature Coloring Properties 5 g of pellets of dry EVOH (A) were heat-melted with a heat compressing press apparatus at 250° C. for 2 minutes to produce a 2 mm-thick disk-shaped sample, and its color phase was evaluated by visual observation according to the following.

Grade: Criteria

A: Scarcely colored.

B: Slightly yellowed.

C: Yellowed.

22. Odor Test 10 g of pellets of dry EVOH (A) and 10 mL of ion exchanged water were put into a 100 mL screw glass tube, and the tube was hermetically sealed with a lid. Thereafter, the blend was put into a safe-vent dryer (dryer) at 90° C. and subjected to heat extraction for 15 hours, and then the screw tube was set aside for 30 minutes at room temperature to cool it. After having been cooled, the lid of the screw tube was opened, the odor of the obtained extract was evaluated by five human monitors according to the following.

Grade: Criteria

A: No odor was sensed.

B: Slight odor was sensed.

C: Odor was sensed.

23. Adhesive Strength Test

Using pellets of dry EVOH (A), a linear low density polyethylene (LLDPE: Ultzex 2022L, made by Mitsui Chemicals, Inc.), and an adhesive resin (Tie: Bondine TX8030 made by Sumika Atochem Co., Ltd.) a multilayer film of three components and five layers (LLDPE/Tie/EVOH/Tie/LLDPE=50μ/10μ/10μ/10μ/50μ) were obtained in the following method.

Specification of Extruder and T Die

Extruder:

EVOH: 20 ϕ extruder, Laboratory-type ME Model CO-EXT (made by Toyo Seiki)

Tie: 25 ϕ extruder, P25–18AC (made by Osaka Seiki)

LLDPE: 32 ϕ extruder GF-32-A (made by Research Laboratory of Plastics Technology Co., Ltd)

EVOH extrusion temperature:

C1/C2/C3/die=175/210/220/220° C.

Tie extrusion temperature:

C1/C2/C3/die=100/160/220/220° C.

LLDPE extrusion temperature:
C1/C2/C3/die=150/200/210/220° C.
T die: 300 mm-wide coat-hunger die (made by Research Laboratory Of Plastics Technology Co., Ltd.)
Adhesive Strength Immediately After Film Formation Immediately after the multilayer film-formation, the obtained multilayer film was cut into a size of 150 mm along the MD orientation and 10 mm along the TD orientation, and the film was immediately subjected to a 90-degree peel strength measurement with an autograph (DCS-50M made by Shimadzu Corp.). In the measurement, the interlayer adhesive strength of the multilayer film between Tie and EVOH near the chill roll side was measured.

Adhesive Strength 1 Week after Film Formation

The 150 mm-long and 10 mm-wide sample made of the above-described multilayer film produced was set aside in a thermostatic room at 23° C. and 50% RH for 1 week. Using this sample, a 90-degree peel strength measurement was carried out with an autograph (DCS-50M, made by Shimadzu Corp.) in a thermostatic room at 23° C. and 50% RH. In the measurement, the interlayer adhesive strength of the multilayer film between Tie and EVOH near the chill roll side was measured.

Example 7

[Production of EVOH (A)]

5 kg of 45% methanol solution of ethylene-vinyl acetate copolymer having an ethylene content 27 mol % and 129 kg of methanol were charged into a saponification reactor having a capacity of 470 L, and while a nitrogen gas was being blown inside the reactor, the internal temperature was made 60° C. A 29 L methanol solution of sodium hydroxide (concentration: 80 g/L) was added thereto to initiate a saponification reaction. During the saponification reaction, a nitrogen gas was continuously blown into the reactor in order to purge the methyl acetate produced as a by-product in the reaction system, together with methanol within the reaction system, out of the reaction system, with the aim of enhancing the reaction efficiency. The speed of the purging was at about 20 kg/hr. for the total of the methyl acetate and the methanol, and these were condensed with a cooling condenser and collected. Two hours after the start of the reaction, a 29 L methanol solution of sodium hydroxide (concentration: 80 g/L) was further added thereto, to further promote the saponification reaction. Six hours after the start of the reaction, 6.8 kg of acetic acid and 56 L of water were added to neutralize the reaction solution to stop the reaction.

The neutralized reaction solution was transferred from the reactor to a drum and set aside for 16 hours at room temperature to cool-solidify in a cake-like state. Thereafter, using a centrifugal separator (H-130, made by Kokusan Enshinki Corp., revolution 1200 rpm), the cake-like resin was dewatered. Subsequently, while continuously supplying ion exchanged water from above to the center of the centrifugal separator, the resin was dewatered and water-washed; this process was performed for 10 hours. The conductance of the washing solution was 30 $\mu$S/cm 10 hours after the start of the washing (measured with CM-30ET made by Toa Electronics, Ltd.).

The granular EVOH thus obtained was dried at 60° C. for 48 hours using a dryer. 20 kg of the dried granular EVOH were dissolved into 43 L of a water/methanol mixed solution (weight ratio: water/methanol=5/5) by stirring the mixture at 80° C. for 12 hours. Next, the stirring is stopped, the temperature of the dissolver was lowered to 65° C., and the mixture was set aside for 5 hours to degass the water/methanol solution of EVOH. Then, the mixture was extruded from a circular orifice having a diameter 3.5 mm formed in a metal plate into a water/methanol mixed solution (weight ratio: water/methanol=9/1) at 5° C. to precipitate strands, which were cut into pellets having a diameter of about 4 mm and a length of about 5 mm.

2.4 kg of the wet pellets thus obtained and 24 L of ion exchanged water were put into a vessel made of plastic having a height of 400 mm and an opening diameter of 370 mm, and the operation in which the mixture was washed while the mixture being stirred at 25° C. for 2 hours and then dewatered was repeated twice. Subsequently, 24 L of aqueous solution of 1 g/L acetic acid was added to 2.4 kg of the wet pellets, and the operation in which the mixture was washed while the mixture being stirred at 25° C. for 2 hours and then dewatered was repeated twice. Further, 24 L of ion exchanged water was added to 2.4 kg of the wet pellets, and the operation in which the mixture was washed while the mixture being stirred at 25° C. for 2 hours and then dewatered was repeated 6 times. After the washing was completed the sixth time, the conductance of the washing solution was measured with CM-30ET made by Toa Electronics Ltd., and as a result, the conductance of the washing solution was found to be 3 $\mu$S/cm. The water content of the obtained EVOH pellets was 50 weight %.

2.4 kg of the thus-obtained washed wet EVOH pellets (ethylene content: 27 mol %, saponification degree: 99.98 mol % or more (calculated using NMR), intrinsic viscosity: 0.094 L/g) and 5 L of aqueous solution of boric acid having a concentration of 0.30 g/L were put into a vessel made of plastic having a height of 300 mm and an opening diameter of 280 mm and dipped at 25° C. for 10 hours, and dewatered after the dipping.

Subsequently, 5 L of ion exchanged water was put into a vessel made of plastic having a height of 300 mm and an opening diameter of 280 mm. A silicon tube (inner diameter 7 mm, outer diameter 10 mm) was placed in the ion exchanged water in this vessel to blow carbon dioxide gas therein with bubbling at a rate of 1 L/minute for 0.5 hours. The supplying of carbon dioxide gas was carried out using a carbon dioxide gas cylinder (30 kg liquefied carbon dioxide gas, made by Nippon Tansan Co., Ltd.) and a flowmeter (Model RK-1600R made by KOFLOC). In the water in which carbon dioxide gas was blown, 0.35 g of boric acid, 0.65 g of potassium hydrogencarbonate, and 0.85 g of potassium dihydrogen phosphate were dissolved, and the blowing of carbon dioxide gas was continued at a rate of 1 L/minute for 1 hour. The content of boric acid in this treatment solution was 0.07 g/L, the content of potassium hydrogencarbonate was 0.13 g/L, the content of potassium dihydrogen phosphate was 0.17 g/L. The pH of the treatment solution was measured after blowing carbon dioxide gas for 1 hours, with a pH meter (MA235 made by Mettler Inc.), and the pH of the treatment solution was 5.0.

Next, while the blowing of carbon dioxide gas was being carried out at a rate of 1 L/minute, 2.4 kg of the above-described wet pellets were charged into the treatment solution, and dipped and stirred at 25° C. for 6 hours. The pH of the treatment solution was measured every hour from the start to the end of the treatment, and it was found that the pH of the treatment solution remained at 5 and did not vary at any measurements. The concentration of carbon dioxide gas in the treatment solution was analyzed, and found to be 20 mmol/L. The pellets were dipped for 6 hours in the treatment solution and stirred, and thereafter the obtained pellets were immediately dewatered, and subjected to hot air drying at 80° C. for 3 hours and subsequently at 107° C. for 24 hours; thus, dry EVOH (A) pellets (water content: 0.2 weight %) were obtained.

The alkali metal salt in the obtained dry EVOH (A) pellet was potassium, and the content of the alkali metal salt was 2.6 μmol/g in terms of metal element whereas the content of phosphoric acid compound (d1) was 0.4 μmol/g in terms of phosphoric acid radical. The content of boron compound in the obtained dry EVOH (A) pellet was 160 ppm (15 μmol/g) in terms of boron element. Also, the amount of carboxylic acid radicals (c1) extracted by dipping the dry EVOH (A) pellets in pure water at 95° C. for 10 hours was 0 ppm (0 μmol/g), and the amount of carboxylic acid (acetic acid) radicals (c2) extracted by dipping the pellets in an aqueous solution of 0.05 N sodium hydroxide at 95° C. for 10 hours was 35 ppm (0.6 μmol/g). The MFI of the dry EVOH (A) pellet was 4.0 g/10 minute (at 210° C. with a 2160 g load).

Using the obtained dry EVOH (A) pellets, a single-layer film was produced in accordance with the above-described method, and a coloring resistance test and a long-term run stability test were performed. The coloring resistance of EVOH (A) of the present example was grade B, the 72 hours long-term run stability was grade A, and the 120 hours long-term run stability was grade B. The content (d2) of phosphoric acid compound (D) in the single-layer film was 0.02 μmol/g in terms of phosphoric acid radical, and the content of phosphorus element (t) was 0.4 μmol/g. The content of organic phosphorous compound extractable with chloroform was less than 0.01 μmol/g.

Using the obtained dry EVOH (A) pellets, a high-temperature coloring properties evaluation test was performed in accordance with the above-described method, and the pellets were evaluated as grade B. In addition, an odor test was performed using the obtained dry EVOH pellets in accordance with the above-described method; all the five human monitors did not sense odors, and the evaluation was grade A.

Further, using the obtained dry EVOH (A) pellets, an adhesive strength test was performed in accordance with the above-described method. The adhesive strength immediately after the film formation was 800 g/15 mm, and the adhesive strength 1 week after the film formation was 950 g/15 mm, both of which proved to be good adhesive strengths.

[Production of a Film Composed of a Resin Compound of the Present Invention]

70 parts by weight of the above-described EVOH (A) and 30 parts by weight of the polyamide resin B-1 obtained in Example 1 were dry blended in advance; thereafter, with the hopper portion being nitrogen-purged, the blend was charged into an extruder equipped with a full-flight type screw, which has a diameter of 40 mm, a L/D ratio of 24, and a compression ratio of 3.8, and using a flat die having a width of 550 mm, a film formation was carried out. The temperatures for the film formation were 190° C. to 240° C. with the extruder and 225° C. with the die. A film having a thickness of 15 μm was wound up with a winding machine, and a continuous film-forming operation was carried out for 24 hours. Twenty-four hours later, the obtained film was subjected to a film surface evaluation and an appearance assessment after hot water treatment (the assessment method is described below), and a die adherence evaluation after film formation.

The film composed of the resin composition obtained according to the present invention had a uniform and flat film surface, and the foreign matters such as fish eyes are practically within an acceptable range. Even after a hot water treatment, the film showed good adhesiveness and did not show peeling-off between the intermediate layer and the inner and outer layers. Furthermore, the amount of EVOH adhered to the die part of the extruder after the film formation fell into an acceptable range that practically does not cause a problem.

Appearance assessment after hot water treatment

Using the obtained film as the intermediate layer, a biaxially-oriented nylon 6 film (Emblem made by Unitika, Ltd., with a thickness of 15 gm) as the outer layer, and a non-oriented polypropylene film (RXC-7 made by Tohcello Co,. Ltd., with a thickness of 60 gm) as the inner layer, Takenate A-385/A-50 made by Takeda Chemical Industries, Ltd., was applied onto these films as an adhesive for dry laminating (two-component type, urethane-based) at 4 $g/m^2$ as solid content, and after evaporating the solvent at 80° C., the films were bonded together and subjected to aging at 40° C. for 5 days; thus, a multilayer film was obtained. From this film, a bag three sides of which were heat sealed was produced, and after filling the bag with a mixture of water and a commercially available salad oil (volume ratio: 90/10), the remaining one side was hermetically sealed by heat sealing. Subsequently, using a retorting equipment (a high-temperature and high-pressure cooking sterilization tester RCS-40RTGN made by Hisaka Works, Ltd.), a hot water treatment was performed at 100° C. for 30 minutes. After the hot water treatment, the bag was preserved in a room at 20° C. and 65% RH for 1 day, and the appearance was assessed.

Example 8

Eval L101 made by Kuraray (ethylene content: 27 mol %, saponification degree: 99.9%, MFI: 7 g/10 minutes (230° C. ,2160 g)) was used as the EVOH (A), and the polyamide resin B-1 was used as the polyamide resin (B). These were dry blended at a weight ratio of 75:25, charged into a single-screw extruder equipped with a full-flight type screw, which had a diameter of 40 mm, an L/D ratio of 24, and a compression ratio of 3.8, and pelletized at a formation temperature of 240° C.; subsequently, the pellets were dried with a hot air dryer until the water content results in 0.15% or less. The MFI measured with the pellets thus obtained was 15 g/10 minutes (230° C., 2160 g). The results are shown in Table 4.

The obtained resin composition pellets were charged in a single-screw extruder having a screw diameter of 20 mm, an L/D ratio of 24, a compression ratio of 3.8, and using a flat die having a width of 150 mm, a film formation was carried out. The temperatures for film formation were 240° C. with the extruder and 20° C. with the chill roll, and a pre-stretch film having a thickness of 135 μm was obtained.

Next, using a pre-stretch film obtained 48 hours after the start of the film-formation, the water content of the pre-stretch film was controlled at 15%, and a simultaneous biaxial-stretching was carried out using a biaxial stretching machine made by Toyo Seiki, under the conditions of a preheating at 80° C. (20 seconds), a stretching temperature of 80° C., a stretch ratio of 9 times (3.0 times lengthwise×3.0 times widthwise), and a stretching speed of 1 m/min; thus, a stretched film having a thickness of 15 μm was obtained. The obtained stretched film was fixed on a wood frame and subjected to a heat treatment at temperature 160° C. for 1 minute with a hot air dryer.

With this stretched film, the oxygen transmission rate was measured using OX-TRAN 100 (made by Modern Controls, Inc.) under the conditions of 20° C. and 65% RH; the result was 0.5ml·15 $\mu m/m^2$·day·atm.

With a stretched film obtained in the same manner, the number of gels (those with a size of about 200 μm or larger, which can be confirmed by naked human eyes) was counted and converted into a number per 1.0 $m^2$. With the number of gels, the conditions of film surfaces were assessed as follows.

A: less than 20, B: from 20 to 50, C: 50 to 100, D: 100 or more

The number of gels of this stretched film was very small, the appearance was beautiful, and the grade of the film surface was A.

Further, using a biaxially-oriented nylon 6 film (Emblem made by Unitika, with a thickness of 15 μm) as the outer layer, a stretched film obtained in the same manner as the foregoing as the intermediate layer, and a non-oriented polypropylene film (RXC-7 made by Tohcello, with a thickness of 60 μm) as the inner layer, Takenate A-385/A-50 made by Takeda Chemical Industries, Ltd., was applied onto these films as an adhesive for dry laminating (two-component type, urethane-based) at 4 g/$m^2$ as solid content, and after evaporating the solvent at 80° C., the films were bonded together and subjected to aging at 40° C. for 5 days. Thus, a multilayer stretched film was obtained.

Three sides of this multilayer stretched film were heat sealed to form a pouch, and after filling the pouch with a mixture of water and a commercially available salad oil (weight ratio: 90/10), the remaining one side was hermetically sealed by heat sealing. Subsequently, using heat sterilization equipment made by Hisaka Works (RCS-40RTGN, commonly referred to as retorting equipment), a hot water treatment was performed at 121° C. for 30 minutes. Thereafter, the pouch was set aside in a room at 20° C. and 65% RH for 1 day, and the surface of the pouch was assessed by visual observation according to the following criteria.

A (good): No whitening or delamination is observed.

B (unacceptable): Slight whitening and delamination are observed.

C (defect): The entirety is whitened and the number of delaminations is large.

This pouch did not show whitening or delamination, and the grade was A. The above results are shown in Table 5.

Example 9

Pellets were obtained in the same manner as in Example 8 except that the polyamide resin B-2 was used in place of B-1 used in Example 8. The MFI measured with these pellets was 15 g/10 minutes (230° C., 2160 g).

The obtained pellets were formed into a film in the same manner as in Example 8, which was then stretched and heat-treated to obtain a stretched film, and the oxygen transmission rate thereof was measured. The result was 0.5 ml·15 μm/$m^2$·day·atm. Further, the film surface condition of a stretched film obtained likewise was assessed in the same manner as in Example 8, and the grade of the film surface was grade A.

In addition, a pouch was produced from a multilayer stretched film with three components and three layers in the same manner as in Example 8, and the pouch was subjected to a hot water treatment, which was followed by an evaluation of the surface of the pouch. No whitening or delamination was observed, and the grade was A.

Example 10

The pellets obtained in Example 8 were used for the intermediate layer, and the inner and outer layers were 6 nylon resin (1022FD made by Ube Industries, Ltd., with a MFI of 5.5 g/10 minutes (230° C., 2160 g) and a melting point of 220° C.). With this construction, these layers were melt-extruded using a co-extruder equipped with a T-shaped die into a two-component, three-layer construction (nylon layer: 45 μ/intermediate layer: 45 μ/nylon layer 45 μ) and at the same time contacted with a chill roll at a temperature of 20 C.; thus, a film formation was carried out to obtain a multilayer pre-stretch film having an entire thickness of 135 μm.

Next, using a multilayer pre-stretch film obtained 48 hours after the start of the film-formation, and a simultaneous biaxial-stretching was carried out using a biaxial stretching machine made by Toyo Seiki, under the conditions of a preheating at 120° C. (15 seconds), a stretching temperature of 120° C., a stretch ratio of 9 times (3.0 times lengthwise×3.0 times widthwise), and a stretching speed of 1 μm/min; thus, a multilayer stretched film with nylon layer 5 μm/intermediate layer 5 μm/nylon layer 5 μm and an entire thickness of 15 μm was obtained. The obtained stretched film was fixed on a wood frame and subjected to a two-stage heat treatment at a temperature of 190° C. for 15 seconds and at a temperature 170° C. for 15 seconds with a hot air dryer.

With this multilayer stretched film, the oxygen transmission rate was measured using OX-TRAN 100 (made by Modern Controls, Inc.) under the conditions of 20° C. and 65% RH; the result was 1.5ml·15 μm/$m^2$·day·atm.

With a stretched film obtained in the same manner, the number of gels (those with a size of about 200 μm or larger, which can be confirmed by naked human eyes) was counted, and the condition of the film surface was assessed in the same manner as in Example 8. The grade of the film surface was A. The thickness of this multilayer stretched film was uniform.

Furthermore, a multilayer stretched film obtained in the same manner and a non-oriented polypropylene film (RXC-7 made by Tohcello, Co. Ltd., with a thickness of 60 μm) were bonded using an adhesive for dry lamination as in Example 8 to obtain a laminated film. Three sides of this laminated film were heat sealed to prepare a pouch, which was subjected to a hot water treatment as in Example 8, and the surface of the pouch was evaluated. No whitening or delamination was observed, and the grade was A.

Reference Example 1

Pellets obtained as in Example 8 were charged into a single-screw extruder having a screw diameter of 20 mm, an L/D ratio of 24, and a compression ratio of 3.8, and using a flat die having a width of 300 mm, a film formation was carried out. The temperatures for film formation were 240° C. with the extruder and 80° C. with the chill roll, and a non-oriented film having a thickness of 15 μm was obtained. The obtained non-oriented film was fixed on a wood frame and subjected to a heat treatment at a temperature of 160° C. for 1 minute with a hot air dryer.

With a non-oriented film obtained 48 hours after the start of the film-formation, the oxygen transmission rate was measured in the same manner as in Example 8; the result was 1.4 ml·15 μm/$m^2$·day·atm, which was about three times the oxygen transmission rate of the stretched film of Example 8. Further, the condition of the film surface of the non-oriented film obtained likewise was assessed as in Example 8, and the grade of the film surface was A.

Furthermore, in the same manner as in Example 8, a pouch was produced from a multilayer film of three components and three layers, and the pouch was subjected to a hot water treatment, which was followed by an evaluation of the surface of the pouch. No whitening or delamination was observed, and the grade was A.

Comparative Example 12

Pellets were obtained in the same manner as in Example 8 except that the polyamide resin B-3 was used in place of B-1. The MFI measured with these pellets was 17 g/10 minutes (230° C., 2160 g).

The obtained pellets were subjected to a film formation in the same manner as in Example 8, and the film was stretched and heat treated to obtain a stretched film, which was subjected to a measurement of oxygen transmission rate. The result was 0.5 ml·15 $\mu$m/m$^2$·day·atm. Further, the film surface condition of the stretched film obtained likewise was assessed in the same manner as in Example 8; gels were observed, and the grade of the film surface was C.

Furthermore, in the same manner as in Example 8, a pouch was produced from a multilayer stretched film of three components and three layers, and the pouch was subjected to a hot water treatment, which was followed by an evaluation the surface of the pouch. Although no whitening was observed, delamination caused by the gels was observed, and the grade was B.

Comparative Example 13

Pellets were obtained in the same manner as in Example 8 except that the polyamide resin B-6 was used in place of B-1. The MFI measured with these pellets was 20 g/10 minutes (230° C., 2160 g).

The obtained pellets were subjected to a film formation in the same manner as in Example 8, and the film was stretched and heat treated to obtain a stretched film, which was subjected to a measurement of oxygen transmission rate. The result was 0.5 ml·15 $\mu$m/m$^2$·day·atm. Further, the film surface condition of the stretched film obtained likewise was assessed in the same manner as in Example 8; gels were observed considerably, and the grade of the film surface was D.

Furthermore, a pouch was produced from a multilayer stretched film of three components and three layers in the same manner as in Example 8, and the pouch was subjected to a hot water treatment, which was followed by an evaluation of the surface of the pouch. Slight whitening was observed, and moreover numerous delaminations caused by the gels were observed.
The grade was B.

Comparative Example 14

Pellets were obtained in the same manner as in Example 8 except that C-6 (Ube Nylon 1011FK, nylon made by Ube Industries, Ltd.) was used in place of the polyamide resin B-1. The MFI measured with these pellets was 20 g/10 minutes (230° C., 2160 g).

The obtained pellets were subjected to a film formation in the same manner as in Example 8, but since numerous gels were generated, the operations subsequent to stretching were abandoned.

Comparative Example 15

A multilayer pre-stretch film of two components and three layers (nylon layer 45 $\mu$m/intermediate layer 45 $\mu$m/nylon layer 45 $\mu$m) having an entire thickness of 135 $\mu$m was obtained in the same manner as in Example 10, except that the pellets obtained in Comparative Example 14 were formed into the intermediate layer. The pre-stretch film obtained 48 hours after the start of the film-formation showed numerous gels.

Subsequently, a simultaneous biaxial stretching and a two-stage heat treatment were performed in the same manner as in Example 10, followed by an oxygen transmission rate measurement and a film surface evaluation. The oxygen transmission rate of the multilayer stretched film was 1.5ml·ml·15 $\mu$m/m$^2$·day·atm. Also, the condition of the film surface of the stretched film obtained likewise was assessed in the same manner as in Example 8. Very many gels were observed, and the grade of the film surface was D. Since the film was found to be of no commercial value at this point, the production of a pouch, the hot water treatment, and the evaluation of pouch surface were not carried out.

The results obtained in Examples 9 and 10, Reference Example, and the foregoing Comparative Examples are also shown in Tables 4 and 5.

TABLE 4

| | | Polyamide resin (B) | | | |
|---|---|---|---|---|---|
| | EVOH (A) | Type | Proportion of terminal imide structure (mol %) | A/B (Weight ratio) | MFI (g/10 min.) |
| Ex. 8 | L101 | B-1 | 76 | 75/25 | 15 |
| Ex. 9 | L101 | B-2 | 71 | 75/25 | 15 |
| Ex. 10 | L101 | B-1 | 76 | 75/25 | 15 |
| Ref. Ex. 1 | L101 | B-1 | 76 | 75/25 | 15 |
| Comp. Ex. 12 | L101 | B-3 | 50 | 75/25 | 17 |
| Comp. Ex. 13 | L101 | B-6 | 28 | 75/25 | 20 |
| Comp. Ex. 14 | L101 | C-6*1 | 0 | 75/25 | 20 |
| Comp. Ex. 15 | L101 | C-6*1 | 0 | 75/25 | 20 |

*1Ube Nylon 1011FK made by Ube Industries

TABLE 5

| | Film used | Oxygen transmission rate (ml · 15 $\mu$m/m$^2$ · day · atm) | Film surface grade | Film layer construction | Appearance after retort process |
|---|---|---|---|---|---|
| Ex. 8 | EVOH-PA(B-1), Single-layer stretched | 0.5 | A | PA/Film/PP | A |
| Ex. 9 | EVOH-PA(B-2), Single-layer stretched | 0.5 | A | PA/Film/PP | A |
| Ex. 10 | PA/EVOH-PA(B-1)/PA Co-extruded and co-stretched | 1.5 | A | PP/Multilayer-film | A |

TABLE 5-continued

| | Film used | Oxygen transmission rate (ml · 15 μm/m² · day · atm) | Film surface grade | Film layer construction | Appearance after retort process |
|---|---|---|---|---|---|
| Ref. Ex. 1 | EVOH-PA(B-1), Single layer (Unstretched) | 1.4 | A | PA/Film/PP | A |
| Comp. Ex. 12 | EVOH-PA(B-3), Single-layer stretched | 0.5 | C | PA/Film/PP | B |
| Comp. Ex. 13 | EVOH-PA(B-6), Single layer stretched | 0.5 | D | PA/Film/PP | B |
| Comp. Ex. 14 | EVOH-PA(C-6), Single layer (Unstretched) | Not measured | Not assessed | Not produced | — |
| Comp. Ex. 15 | PA/EVOH-PA(C-6)/PA Co-extruded and co-stretched | 1.5 | D | Not produced | — |

Example 11

Eval F101 made by Kuraray (ethylene content: 32 mol %, saponification degree: 99.9%, MFI: 7.0 g/10 minutes (230° C., 2160 g)) was used as the EVOH (A), and the polyamide resin B-1 was used as the polyamide resin (B). These were dry blended at a weight ratio of 75:25 and charged into a single-screw extruder with a diameter of 40 mm. In addition, a 6 nylon resin (1022FD made by Ube Industries, Ltd., with a relative viscosity of 2.8, a MFI of 5.5 g/10 minutes (230° C., 2160 g) and a melting point of 220° C.) was supplied to another single-screw extruder with a diameter of 40 mm; Admer QF551 made by Mitsui Chemicals, Inc. was supplied as an adhesive resin to an extruder having a diameter of 30 mm; and polypropylene (Novatec PP FW3E made by Japan Polychem Corp., with a MFI of 7.0 g/10 minutes (230° C., 2160 g)) was supplied to an extruder having a diameter of 65 mm. With a feed block-type multilayer film production facility (die temperature: 250° C.), the following multilayer co-extruded film was formed.

PP/Ad/Ny/E/Ny/Ad/PP (thickness: 15/10/5/15/5/10/30 μm)

In the above-noted film construction, PP denotes polypropylene, Ad denotes adhesive agent, Ny denotes nylon, E denotes a (EVOH+polyamide resin) resin composition, PES denotes polyester, and Al denotes aluminum.

With a multilayer film obtained 48 hours after the start of the film-formation, the oxygen transmission rate was measured using OXY-TRAN100 (made by Modern Controls, Inc.) under the conditions of 20° C. and 65% RH; the result was 2.0 ml/m²·day·atm. This multilayer film exhibited good appearance.

With a multilayer film obtained in the same manner, the number of gels (those with a size of about 200 μm or larger, which can be confirmed by naked human eyes) was counted and converted into a number per 1.0 m². With the number of gels, the conditions of the film surface were assessed as follows.

A: less than 20, B: from 20 to 50, C: 50 to 100, D: 100 or more The number of gels of this multilayer film was very small, the appearance was beautiful, and the grade of the film surface was A.

Further, a multilayer film obtained in the same manner was subjected to a thermoforming process at 180° C. using a circular metal mold having a bore diameter of 12 cm and a depth of 2 cm and a batch-type vacuum forming machine. Observation of the obtained circular thermoformed product proved that the appearance was good.

Furthermore, three sides of a multilayer film obtained in the same manner were heat sealed to produce a pouch, and after filling the pouch with a mixture of water and a commercially available salad oil (weight ratio: 90/10), the remaining one side was hermetically sealed by heat sealing. Subsequently, using heat sterilization equipment made by Hisaka Works (RCS-40RTGN, commonly referred to as retorting equipment), a hot water treatment was performed at 121° C. for 30 minutes. Thereafter, the pouch was set aside in a room at 20° C. and 65% RH for 1 day, and the surface of the pouch was assessed by visual observation according to the following criteria.

A (good): No whitening or delamination is observed.

B (unacceptable): Slight whitening and delamination are observed.

C (defect): The entirety is whitened and the number of delaminations is large.

This pouch did not show whitening or delamination, and the grade was A. The above results are shown in Table 6.

Example 12

Eval F104 made by Kuraray (ethylene content: 32 mol %, saponification degree: 99.9%, MFI: 20.0 g/10 minutes (230° C., 2160 g)) was used as the EVOH (A), and the polyamide resin B-1 was used as the polyamide resin (B). These were dry blended at a weight ratio of 90:10, charged into a single-screw extruder equipped with a full-flight type screw having a diameter of 40 mm, an L/D ratio of 24, and a compression ratio of 3.8, and pelletized at a formation temperature of 240° C. Subsequently, the pellets were dried with a hot air dryer until the water content results in 0.15% or less.

The obtained pellets were charged into a single-screw extruder having a diameter of 65 mm; also, Admer NF538E made by Mitsui Chemicals, Inc. was charged as an adhesive resin into an extruder having a diameter of 45 mm; and by multilayer co-extrusion coating using a feed block-type multilayer film production facility (die temperature: 250° C.), they were placed between a 400 μm-thick white board (paper) coated with 40 μm-thick polypropylene (Novatec PP FW3E made by Japan Polychem Corp.) and a 16 μm-thick aluminum foil coated with 40 μm-thick polypropylene (Novatec PP FW3E made by Japan Polychem Corp.) to form a multilayer co-extruded film having the following construction.

PP/paper/Ad/E/Ad/Al foil/PP (thickness: 40/400/5/15/5/16/40 μm)

With a multilayer film obtained 48 hours after the start of the film-formation, the oxygen transmission rate was measured in the same manner as in Example 11; the result was 0.9 ml/m$^2$·day·atm. This multilayer film exhibited good appearance. Further, the number of gels (those with a size of about 200 μm or larger, which can be confirmed by naked human eyes) on the multilayer film obtained likewise was counted, and the condition of the film surface was assessed in the same manner as in Example 11. The grade of the film surface was A.

Furthermore, a pouch was produced from the multilayer film in the same manner as in Example 11, and the pouch was subjected to a hot water treatment, which was followed by an evaluation of the surface of the pouch. No whitening or delamination was observed, and the grade was A.

Example 13

Eval F101, the EVOH used in Example 11 was used as the EVOH (A), and the polyamide resin B-1 was used as the polyamide resin (B). These were dry blended at a weight ratio of 75:25, and pellets thereof were obtained in the same manner as in Example 12.

The obtained pellets were charged into a single-screw extruder having a diameter of 65 mm, and 1022FD, the 6 nylon resin used in Example 11, was supplied to another single-screw extruder having a diameter of 40 mm; with a feed block-type multilayer film production facility (die temperature: 250° C.) a multilayer co-extruded film having a construction Ny/E/Ny (thickness: 30/15/30 μm) was formed.

Further, using a multilayer film obtained 48 hours after the start of the film-formation and a non-oriented polypropylene film (RXC-7 made by Tohcello, Co. Ltd. with a thickness of 60 μm), Takenate A-385/A-50 made by Takeda Chemical Industries, Ltd. was applied onto these films an adhesive for dry laminating (two-component type, urethane-based) at 4 g/m$^2$ as solid content, and after evaporating the solvent at 80° C., the films were bonded together and subjected to aging at 40° C. for 5 days. Thus, a laminate was obtained.

With the obtained laminate, the oxygen transmission rate was measured in the same manner as in Example 11. The result was 2.0 ml/m$^2$·day·atm. This laminate exhibited good appearance. Further, the number of gels (those with a size of about 200 μm or larger, which can be confirmed by naked human eyes) on the laminate obtained likewise was counted, and the condition of the film surface was assessed in the same manner as in Example 11. The grade of the film surface was A.

A laminate obtained likewise was subjected to a thermoforming process in the same manner as in Example 11. Observation of the obtained formed product proved that the appearance was good.

Furthermore, a pouch was produced from the laminate in the same manner as in Example 11, and the pouch was subjected to a hot water treatment, which was followed by an evaluation of the surface of the pouch. No whitening or delamination was observed, and the grade was A.

Example 14

Eval F104, used in Example 12, was used as the EVOH (A), and the polyamide resin B-1 was used as the polyamide resin (B). These were dry blended at a weight ratio of 75:25 and charged into a single-screw film-forming machine having a diameter of 90 mm, and a single layer film having a thickness 15 μm was formed at a die temperature of 250° C.

Further, using a biaxially-oriented polyester film (Lumirror P60 made by Toray, with a thickness 12 μm) as the outer layer, a single layer film obtained 48 hours after the start of the film-formation as the intermediate 65 layer, and a non-oriented polypropylene film (RXC-7 made by Tohcello, Co. Ltd., with a thickness 60 μm) as the inner layer, Takenate A-385/A-50 made by Takeda Chemical Industries, Ltd. was applied onto these films as an adhesive for dry laminating (two-component type, urethane-based) at 4 g/m$^2$ as solid content, and after evaporating the solvent at 80° C., the films were bonded together and subjected to aging at 40° C. for 5 days. Thus, a multilayer film was obtained.

With the obtained multilayer film, the oxygen transmission rate was measured in the same manner as in Example 11. The result was 2.0 ml/m$^2$·day·atm. This multilayer film exhibited good appearance. Further, the number of gels (those with a size of about 200 μm or larger, which can be confirmed by naked human eyes) on the multilayer film obtained likewise was counted, and the condition of the film surface was assessed in the same manner as in Example 11. The grade of the film surface was A.

Furthermore, a pouch was produced from the laminate in the same manner as in Example 11, and the pouch was subjected to a hot water treatment, which was followed by an evaluation of the surface of the pouch. No whitening or delamination was observed, and the grade was A.

Comparative Example 16

A film-formation was performed in the same manner as in Example 11 except that the polyamide resin C-1 was used in place of B-1 to obtain a multilayer film, and the oxygen transmission rate was measured. The result was 2.5 ml/m$^2$·day·atm. This multilayer film had streaks on the surface. Also, the condition of the film surface of the multilayer film was assessed in the same manner as in Example 11. The assessment revealed that gels were observed considerably, and the grade of the film surface was D. Further, a thermoformed product was obtained in the same manner as in Example 11, and the appearance was observed. The molded product was broken.

Furthermore, a pouch was produced in the same manner as in Example 11, and the pouch was subjected to a hot water treatment, which was followed by an evaluation of the surface of the pouch. The grade was C.

Comparative Example 17

A film-formation was performed in the same manner as in Example 11 except that the polyamide resin B-3 was used in place of B-1 to obtain a multilayer film, and the oxygen transmission rate was measured. The result was 2.5 ml/m$^2$·day·atm. This multilayer film had streaks on the surface. Also, the condition of the film surface of the multilayer film was assessed in the same manner as in Example 11. The assessment revealed that numerous gels were observed, and the grade of the film surface was C. Further, a thermoformed product was obtained in the same manner as in Example 11, and the appearance was observed. The molded product was broken.

Furthermore, a pouch was produced in the same manner as in Example 11, and the pouch was subjected to a hot water treatment, which was followed by an evaluation of the surface of the pouch. The grade was B.

Comparative Example 18

A film-formation was performed in the same manner as in Example 13 except that the polyamide resin C-1 was used in place of B-1 to obtain a multilayer film and further obtain a laminate, and the oxygen transmission rate was measured. The result was 2.5 ml/m$^2$·day·atm. This multilayer film had gels with a size of about 700 $\mu$m in portions, and in those portions, lift of lamination was seen. Also, the condition of the film surface of the multilayer film was assessed in the same manner as in Example 11. The assessment revealed that gels were observed considerably, and the grade of the film surface was D. Further, a thermoformed product was obtained in the same manner as in Example 11, and the appearance was observed. Observation revealed that the above-noted delamination (lift of lamination) further enlarged. Since the film was found to be of no commercial value at the point where the film surface was assessed, the production of pouches, the hot water treatment, and the evaluation of pouch surface were not carried out.

Comparative Example 19

A film-formation was performed in the same manner as in Example 14 except that the polyamide resin C-1 was used in place of B-1 to obtain a single-layer film and further a multilayer film, and the oxygen transmission rate was measured. The result was 2.5 ml/m$^2$·day·atm. This multilayer film had gels with a size of about 700 $\mu$m in portions, and in those portions, delamination (lift of lamination) was seen. Also, the condition of the film surface of the multilayer film was assessed in the same manner as in Example 11. The assessment revealed that gels were observed considerably, and the grade of the film surface was D. Since the film was found to be of no commercial value at the point where the film surface was assessed, the production of pouches, the hot water treatment, and the evaluation of pouch surface were not carried out.

The results obtained from the foregoing Examples 11 to 14 and Comparative Examples are shown in Table 6.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A resin composition comprising:

an ethylene-vinyl alcohol copolymer (A) and a polyamide resin (B), wherein 70 mol % or more of all terminal ends of the polyamide resin (B) are blocked with units containing an imide structure.

2. The resin composition according to claim 1, wherein at least a portion of the units containing an imide structure is units containing a cyclic imide structure.

3. The resin composition according to claim 2, wherein at least a portion of the units containing a cyclic imide structure is units containing a phthalimide structure or a succinimide structure.

4. The resin composition according to claim 1, wherein the amount of terminal amino groups of the polyamide resin (B) is 10 $\mu$eq/g or less.

5. The resin composition according to claim 1, wherein 75 mol % or more of the units that constitute the polyamide resin (B) are caproamide units.

6. The resin composition according to claim 1, wherein the ethylene-vinyl alcohol copolymer (A) has an ethylene content of 10 to 65 mol % and a saponification degree of 90 mol % or more.

7. The resin composition according to claim 1, wherein the weight ratio of the ethylene-vinyl alcohol copolymer (A) with respect to the polyamide resin (B) is from 95/5 to 50/50.

8. A film comprising a resin composition, wherein the resin composition is as claimed in claim 1.

9. A structure comprising a resin composition, wherein the resin composition is as claimed in claim 1.

10. A method for producing a resin composition, comprising:

mixing an ethylene-vinyl alcohol copolymer (A) and a polyamide resin (B), wherein 70 mol % or more of all terminal ends of the polyamide resin (B) are blocked with units containing an imide structure.

TABLE 6

| | Film construction | Oxygen transmission rate (ml/m$^2$ · day · atm) | Film appearance | Film surface grade (gel) | Appearance of heat-molded product | Appearance |
|---|---|---|---|---|---|---|
| Ex. 11 | PP/Ad/Ny/E/Ny/Ad/PP | 2.0 | Good | A | Good | A |
| Ex. 12 | PP/paper/Ad/E/Ad/Al foil/PP | 0.9 | Good | A | — | A |
| Ex. 13 | Ny/E/Ny/Ad/PP | 2.0 | Good | A | Good | A |
| Ex. 14 | PES/Ad/E/Ad/PP | 2.0 | Good | A | — | A |
| Comp. Ex. 16 | PP/Ad/Ny/E/Ny/Ad/PP | 2.5 | Streak | D | Breakage | C |
| Comp. Ex. 17 | PP/Ad/Ny/E/Ny/Ad/PP | 2.5 | Streak | C | Breakage | B |
| Comp. Ex. 18 | Ny/E/Ny/Ad/PP | 2.5 | Delamination | D | Lamination lift | — |
| Comp. Ex. 19 | PES/Ad/E/Ad/PP | 2.5 | Delamination | D | — | — |

PP: polypropylene,
Ad: adhesive agent,
Ny: nylon,
E: (EVOH + polyamide resin) resin composition,
PES: polyester,
Al: aluminum

11. The method for producing a resin composition according to claim 10, wherein the relative viscosity of the polyamide resin (B) is 2.0 to 7.0.

12. The method for producing a resin composition according to claim 10, further comprising reacting a polyamide resin (C), 75 mol % or more of all terminal ends of which are amino groups, with a terminal-blocking agent (D) capable of forming an imide structure with the amino groups, to obtain the polyamide resin (B).

13. The method for producing a resin composition according to claim 12, wherein 75 mol % or more of the units that constitute the polyamide resin (C) are caproamide units.

14. The method for producing a resin composition according to claim 12, wherein the relative viscosity of the polyamide resin (C) is 2.0 to 7.0.

15. The method for producing a resin composition according to claim 12, wherein the terminal-blocking agent (D) is a cyclic acid anhydride.

16. The method for producing a resin composition according to claim 15, wherein at least a portion of the cyclic acid anhydride is a phthalic anhydride or a succinic anhydride.

17. The method for producing a resin composition according to claim 10, wherein the ethylene-vinyl alcohol copolymer (A) has an ethylene content of 10 to 65 mol % and a saponification degree of 90 mol % or more.

18. The method for producing a resin composition according to claim 10, wherein the ethylene-vinyl alcohol copolymer (A) and the polyamide resin (B) are mixed so that the weight ratio of the ethylene-vinyl alcohol copolymer (A) with respect to the polyamide resin (B) results in 95/5 to 50/50.

19. A polyamide resin comprising terminal ends, 70 mol % or more of all of which are blocked with units containing an imide structure.

* * * * *